United States Patent
Huang et al.

(10) Patent No.: US 12,063,092 B2
(45) Date of Patent: Aug. 13, 2024

(54) MULTI-BAND COMMUNICATION, INTERFACE PARAMETER UPDATE METHOD, AND RELATED DEVICE

(71) Applicant: HUAWEI TECHNOLOGIES CO., LTD., Guangdong (CN)

(72) Inventors: Guogang Huang, Shenzhen (CN); Yuchen Guo, Shenzhen (CN); Ming Gan, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 17/749,349

(22) Filed: May 20, 2022

(65) Prior Publication Data
US 2022/0286194 A1 Sep. 8, 2022

Related U.S. Application Data

(63) Continuation of application No. PCT/CN2020/120951, filed on Oct. 14, 2020.

(30) Foreign Application Priority Data

Nov. 22, 2019 (CN) .......................... 201911159823.8

(51) Int. Cl.
*H04B 7/08* (2006.01)
*H04L 1/00* (2006.01)
(Continued)

(52) U.S. Cl.
CPC ......... *H04B 7/0868* (2013.01); *H04B 7/0888* (2013.01); *H04L 1/0003* (2013.01);
(Continued)

(58) Field of Classification Search
CPC ... H04B 7/0868; H04B 7/0888; H04L 1/0003; H04L 45/245; H04W 72/0453;
(Continued)

(56) References Cited

U.S. PATENT DOCUMENTS 9,113,349 B2 * 8/2015 Tolentino .............. H04L 1/0001
2009/0191858 A1 * 7/2009 Calisti .................. H04W 28/18
455/422.1

(Continued)

FOREIGN PATENT DOCUMENTS

CN 110167201 A 8/2019
CN 110199549 A 9/2019
(Continued)

OTHER PUBLICATIONS

IEEE Std 802.11-2016, IEEE Standard for Information technology-Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Emmanuel Bayard

(57) ABSTRACT

This application discloses an interface parameter update method, comprising: a multi-link (ML) device, based on a status change of each of a plurality of network interfaces comprised in the ML device, updates parameters of enabled network interfaces in the plurality of network interfaces, wherein the parameters comprise at least one of capability information or an operation parameter, the plurality of network interfaces work on different frequency bands, and the plurality of network interfaces share antennas configured in the ML device.

16 Claims, 12 Drawing Sheets

1301

An ML device updates, based on a status change of each of a plurality of network interfaces included in the ML device, parameters of enabled network interfaces in the plurality of network interfaces

(51) Int. Cl.
*H04W 72/0453* (2023.01)
*H04W 76/15* (2018.01)
*H04W 88/06* (2009.01)

(52) U.S. Cl.
CPC ....... *H04W 72/0453* (2013.01); *H04W 76/15* (2018.02); *H04W 88/06* (2013.01)

(58) Field of Classification Search
CPC ..... H04W 76/15; H04W 88/06; H04W 84/12; H04W 88/10; H04W 12/06
USPC ......................................... 375/267, 299, 347
See application file for complete search history.

(56) References Cited

U.S. PATENT DOCUMENTS

| | | | |
|---|---|---|---|
| 2010/0061336 | A1 | 3/2010 | Kim et al. |
| 2013/0156005 | A1 | 6/2013 | Li et al. |
| 2015/0092737 | A1* | 4/2015 | Damodaran ............ H04W 8/22 370/329 |
| 2015/0117357 | A1 | 4/2015 | Ozturk et al. |
| 2018/0192122 | A1* | 7/2018 | Rajapakse ........ H04N 21/44227 |
| 2019/0082373 | A1 | 3/2019 | Patil et al. |
| 2019/0158413 | A1 | 5/2019 | Patil et al. |
| 2019/0222376 | A1 | 7/2019 | Wu et al. |
| 2021/0100050 | A1* | 4/2021 | Ho ........................ H04W 76/15 |

FOREIGN PATENT DOCUMENTS

| | | |
|---|---|---|
| JP | 2006345158 A | 12/2006 |
| JP | 2016129411 A | 7/2016 |
| JP | 2017516366 A | 6/2017 |
| JP | 2018170654 A | 11/2018 |

OTHER PUBLICATIONS

International Search Report and Written Opinion issued in PCT/CN2020/120951, dated Jan. 13, 2021, 9 pages.

Extended European Search Report issued in EP20890893.9, dated Nov. 10, 2022, 7 pages.

Office Action issued in JP2022-529747, dated Jun. 27, 2023 with English translation, 13 pages.

* cited by examiner

In a process in which an AP device authenticates a STA device, the AP device sends a target packet to the STA device ~401

FIG. 4

In a process in which two ML devices perform FST, one ML device sends an FST frame to the other ML device, where the FST frame includes a multi-band element ~501

FIG. 5

In a process in which two devices perform packet-level multi-link aggregation, the two ML devices communicate with each other by using MAC addresses of their respective SAPs  701

| Element ID<br>Element<br>identifier | Length<br>Length | Number of ML-<br>entities (e.g. N)<br>Number of multi-<br>link entities | ML-Entity ID<br>Multi-link entity<br>identifier | Traffic info<br>Traffic information |
|---|---|---|---|---|

Repeat for N times

FIG. 12

An ML device updates, based on a status change of each of a plurality of network interfaces included in the ML device, parameters of enabled network interfaces in the plurality of network interfaces — 1301

FIG. 13

MULTI-BAND COMMUNICATION, INTERFACE PARAMETER UPDATE METHOD, AND RELATED DEVICE

CROSS-REFERENCE TO RELATED APPLICATIONS

This application is continuation of International Application No. PCT/CN2020/120951, filed on Oct. 14, 2020, which claims priority to Chinese Patent Application No. 201911159823.8, filed on Nov. 22, 2019. The disclosures of the aforementioned applications are herein incorporated by reference in their entireties.

TECHNICAL FIELD

This application relates to the field of communication technologies, and in particular, to a multi-band communication method, an interface parameter update method, and related devices.

BACKGROUND

With development of wireless technologies, more devices support multi-band communication. For example, a device can simultaneously perform communication on a 2.4 GHz frequency band, a 5 GHz frequency band, and a 6 GHz frequency band. Even if a quantity of antennas is limited, a multi-band device can perform switching on different frequency bands, to select an optimal frequency band. This ensures communication quality of the multi-band device.

The multi-band device may be referred to as a multi-link (ML) device. The ML device may perform multi-link aggregation (MLA). Multi-link aggregation means that one ML device uses a plurality of links to simultaneously send data, to improve a transmission rate.

SUMMARY

This application provides a multi-band communication method, an interface parameter update method, and related devices, so that a station (STA) device can quickly switch among a plurality of access points (AP). Technical solutions are described as follows.

According to a first aspect, a multi-band communication method is provided. In this method, in a process in which an AP device authenticates a STA device, the AP device sends a target packet to the STA device. The AP device includes a plurality of APs, and the plurality of APs work on different frequency bands.

It should be noted that, that authenticating the STA device by the AP device means that the AP device performs identity authentication on the STA device at a link layer. Identity authentication generally includes association and key derivation.

In addition, the target packet includes a plurality of multi-band elements, the plurality of multi-band elements one-to-one correspond to the plurality of APs, each of the plurality of multi-band elements includes frequency band information of a corresponding AP, and the plurality of multi-band elements indicate the STA device to perform association and key derivation with the plurality of APs.

In this embodiment of this application, the AP device may include the plurality of multi-band elements in the target packet sent to the STA device, to send, to the STA device, related information about the frequency bands on which the plurality of APs included in the AP device work, and indicate the STA device to perform association and key derivation with the plurality of APs. In this way, the STA device can quickly switch among the plurality of APs.

In a possible implementation, the target packet is an association response frame generated in an association process, and/or the target packet is a key message generated in a key derivation process.

Optionally, when the target packet is the key message generated in the key derivation process, the target packet further includes a robust security network information element, the robust security network information element includes a request type, and the request type includes a single-link association type and a corresponding key derivation type, or the request type includes a multi-link association type and a corresponding key derivation type.

It should be noted that the single-link association type means that single-link association may be performed with the AP device, the multi-link association type means that multi-link association may be performed with the AP device, and the key derivation type indicates an encryption protocol that can be used when key derivation is performed with the AP device.

In a possible case, the STA device includes a plurality of STAs, the plurality of STAs work on different frequency bands, the plurality of STAs have different MAC (Media Access Control) addresses, the plurality of STAs correspond to a first service access point (SAP), and the plurality of APs correspond to a second service access point (SAP).

An association request frame sent by the STA device to the AP device includes a first information element, where the first information element includes a MAC address of the first SAP; or an address field in a frame header of an association request frame sent by the STA device to the AP device includes a MAC address of the first SAP.

An association response frame sent by the AP device to the STA device includes a second information element, where the second information element includes a MAC address of the second SAP; or an address field in a frame header of an association response frame sent by the AP device to the STA device includes a MAC address of the second SAP.

It should be noted that the MAC address of the first SAP is used to generate a key in the key derivation process, and the key may be used on all links in an ML-entity corresponding to the first SAP. The MAC address of the second SAP is used to generate a key in the key derivation process, and the key may be used on all links in an ML-entity corresponding to the second SAP.

In addition, the first information element may further include indication information indicating an encryption algorithm preferentially used by the STA device, and/or the first information element may further include a MAC address of each of the plurality of STAs. The second information element may further include indication information indicating an encryption algorithm preferentially used by the AP device, and/or the second information element may further include a MAC address of each of the plurality of APs.

It should be noted that when the association request frame includes the MAC address of the first SAP and the MAC address of each of the plurality of STAs, the MAC address of the first SAP is used to generate an encryption key of a unicast data frame in the key derivation process, and the MAC address of each STA is used to generate an encryption key of a multicast data frame in the key derivation process. When the association response frame includes the MAC address of the second SAP and the MAC address of each of the plurality of APs, the MAC address of the second SAP is used to generate the encryption key of the unicast data frame in the key derivation process, and the MAC address of each AP is used to generate the encryption key of the multicast data frame in the key derivation process.

It should be noted that the STA device and the AP device may agree upon, based on the MAC address of the first SAP, the MAC address of the second SAP, the encryption algorithm preferentially used by the STA device, the encryption algorithm preferentially used by the AP device, the MAC address of each of the plurality of STAs, and the MAC address of each of the plurality of APs that are obtained in the association process, a key in the key derivation process, so that key agreement efficiency can be improved.

In another possible case, an association request frame sent by the STA device to the AP device includes a third information element, the third information element includes multi-AP association indication information, and the multi-AP association indication information is used to request to simultaneously perform association and key derivation with the plurality of APs.

An association response frame sent by the AP device to and the STA device includes a second information element, the second information element includes a MAC address of a second SAP; or an address field in a frame header of an association response frame sent by the AP device to the STA device includes a MAC address of a second SAP. The MAC address of the second SAP is used to generate a key in the key derivation process.

In addition, the second information element may further include indication information indicating an encryption algorithm preferentially used by the AP device, and/or the second information element may further include a MAC address of each of the plurality of APs.

In this embodiment, when the STA device includes the multi-AP association indication information in the association request frame sent to the AP device, it indicates that the STA device expects to simultaneously perform association and key derivation with the plurality of APs in the AP device. In this case, the AP device may include the MAC address of the second SAP in the association response frame returned to the STA device, may further include the MAC address of each of the plurality of APs in the association response frame and indication information indicating the encryption algorithm preferentially used by the AP device. In this way, the STA device may subsequently complete key derivation with the plurality of APs based on the MAC address of the second SAP, the MAC address of each of the plurality of APs, and the encryption algorithm preferentially used by the AP device.

Further, to prevent the STA device from randomly switching among the plurality of APs, a beacon frame sent by each of the plurality of APs includes an access control policy information element, and the access control policy information element includes at least one of a quantity of the plurality of APs, an access policy of each of the plurality of APs, switching threshold indication information, or STA association restriction.

It should be noted that the switching threshold indication information indicates the STA device to perform AP switching when signal quality decreases to a first threshold, and the STA association restriction indicates a type of a STA that is allowed to be associated with each of the plurality of APs.

In addition, for any one of the plurality of APs, an access policy of the AP includes at least one of a service policy or timeout information. The service policy indicates a highest access category (AC) or a TID of a data packet that is allowed by the AP to transmit, and the timeout information indicates the STA device to perform AP switching when the STA device does not receive, within a preset duration, a data packet that is of a highest AC or a TID and that is allowed by the AP to transmit.

According to a second aspect, a multi-band communication method is provided. In this method, in a process in which two ML devices perform FST, one ML device sends an FST frame to the other ML device, and the FST frame includes a multi-band element.

It should be noted that the multi-band element includes a packet-level MLA supported field, and the packet-level MLA supported field indicates whether packet-level multi-link aggregation is supported.

In this embodiment of this application, after one ML device sends the FST frame to the other ML device, the other ML device may learn of whether the ML device supports packet-level multi-link aggregation. In this way, the two ML devices that perform FST may learn whether each other supports packet-level multi-link aggregation, and perform FST based on whether each other supports packet-level multi-link aggregation, so that the two devices complete FST more quickly and accurately.

In a possible implementation, one of the two ML devices is a STA device, and the other ML device is an AP device. The multi-band element in the FST frame sent by the STA device to the AP device includes a non-collocated supported field, and the non-collocated supported field indicates whether non-collocated multi-link aggregation is supported.

In this embodiment of this application, the STA device may include the non-collocated supported field in the multi-band element in the FST frame sent to the AP device, to indicate whether the STA device supports multi-link aggregation with a plurality of APs that belong to different physical devices. In this way, the AP device can accordingly adjust a communication policy between the AP device and the STA device.

In another possible implementation, one of the two ML devices is the STA device, and the other ML device is the AP device. The multi-band element in the FST frame sent by the AP device to the STA device includes a multi-band connection capability field, the multi-band connection capability field includes a non-collocated AP indication bit, and the non-collocated AP indication bit indicates whether multi-link aggregation with an AP that belongs to another physical device is supported.

In this embodiment of this application, the AP device may include the non-collocated AP indication bit in the multi-band connection capability field in the multi-band element in the FST frame sent to the STA device, to indicate whether an AP in the AP device supports multi-link aggregation with the AP that belongs to the another physical device. In this way, the STA device can accordingly adjust the communication policy between the STA device and the AP device.

In still another possible implementation, one of the two ML devices is a STA device, the other ML device is an AP device, and the FST frame sent by the STA device to the AP device includes a mobility domain element. The mobility domain element includes a non-collocated supported field, and the non-collocated supported field indicates whether non-collocated multi-link aggregation is supported. Alternatively, the mobility domain element includes a non-collocated flow-level MLA supported field and a non-collocated packet-level MLA supported field. The non-collocated flow-level MLA supported field indicates whether non-collocated multi-link aggregation is supported when flow-level multi-link aggregation is performed, and the non-collocated packet-level MLA supported field indicates whether non-collocated multi-link aggregation is supported when packet-level multi-link aggregation is performed.

In this embodiment of this application, the STA device may include the non-collocated supported field in the mobility domain element in the FST frame sent to the AP device, to indicate whether the STA device supports multi-link aggregation with a plurality of APs that belong to different physical devices. In this way, the AP device can accordingly adjust a communication policy between the AP device and the STA device. Alternatively, the STA device may include the non-collocated flow-level MLA supported field and the non-collocated packet-level MLA supported field in the mobility domain element in the FST frame sent to the AP device, to separately indicate whether the STA device supports multi-link aggregation with the plurality of APs that belong to the different physical devices when flow-level multi-link aggregation and packet-level multi-link aggregation are performed. In this way, the AP device can accordingly adjust the communication policy between the AP device and the STA device.

In addition, the multi-band element further includes a first flag bit, the first flag bit indicates whether the multi-band element includes a link identity field, and the link identity field indicates a frequency band to which the two ML devices need to transfer an FST session.

In addition, the multi-band element further includes a second flag bit, the second flag bit indicates whether the multi-band element includes a multi-band control field, and the multi-band control field includes the packet-level MLA supported field.

According to a third aspect, a multi-band communication method is provided. In this method, in a process in which two ML devices perform packet-level multi-link aggregation, the two ML devices communicate with each other by using MAC addresses of their respective SAPs, and an SAP of each ML device corresponds to a plurality of network interfaces included in each ML device.

It should be noted that for any one of the two ML devices, an SAP of the ML device corresponds to a plurality of network interfaces included in the ML device. In other words, the SAP of the ML device is one ML-SAP corresponding to the plurality of network interfaces on which packet-level multi-link aggregation is performed in the ML device. A MAC address of the SAP of the ML device may be a newly allocated MAC address, or may be a MAC address of one of the plurality of network interfaces.

In this embodiment of this application, in the process in which the two ML devices perform packet-level multi-link aggregation, the two ML devices communicate with each other by using the MAC addresses of their respective SAPs. In this way, the two ML devices can quickly and accurately implement multi-band communication.

Optionally, in a communication process of the two ML devices, an address field of a data frame sent by one of the two ML devices to the other ML device includes a MAC address of an SAP of the other ML device.

Optionally, in the communication process of the two ML devices, an address field of a control frame sent by one of the two ML devices to the other ML device includes the MAC address of the SAP of the other ML device or a MAC address of one network interface of the other ML device, and an address field of a management frame sent by the ML device to the other ML device includes the MAC address of the SAP of the other ML device or the MAC address of the one network interface of the other ML device. Alternatively, in the communication process of the two ML devices, address fields in a control frame and a management frame that are sent by one of the two ML devices to the other ML device both include a MAC address of one network interface of the other ML device. Alternatively, in the communication process of the two ML devices, an address field of a specified control frame sent by one of the two ML devices to the other ML device includes the MAC address of the SAP of the other ML device, and an address field in a management frame sent by the ML device to the other ML device and an address field in a control frame other than the specified control frame both include a MAC address of one network interface of the other ML device.

It should be noted that in this embodiment of this application, one link is allowed to simultaneously belong to a plurality of ML-entities. In other words, the one network interface may correspond to the plurality of ML-entities. In this case, in addition to having a MAC address (namely, a MAC address of an ML-SAP corresponding to each ML-entity), each ML-entity is further allocated with a multi-link entity identifier, and the multi-link entity identifier may be used in other phases other than a multi-link aggregation setup phase.

For example, in the communication process of the two ML devices, a frame header of the control frame sent by one of the two ML devices to the other ML device includes an aggregation control field, and the aggregation control field includes a multi-link entity identifier and control information.

In a possible implementation, in the communication process of the two ML devices, an action frame sent by one of the two ML devices to the other ML device includes a category field, and a value of the category field is the same as a value of a category field included in an FST frame. In this case, the action frame and the FST frame in this embodiment of this application share one category value, so that a multi-link aggregation operation can be implemented by using an FST mechanism.

When the action frame is a multi-link aggregation setup request frame or a multi-link aggregation setup response frame, the action frame includes a fourth information element, and the fourth information element indicates multi-link entity information. In this way, in a multi-link aggregation setup process, the ML device may quickly and accurately perform multi-link aggregation setting based on the multi-link entity information included in the fourth information element.

It should be noted that the fourth information element includes at least one of a collocated field, a multi-link aggregation initiator MAC address field, a multi-link aggregation responder MAC address field, a multi-link entity identifier field, a home link information field, or a component link information list field. The component link information list field indicates information about each component link.

According to a fourth aspect, an interface parameter update method is provided. In this method, an ML device updates, based on a status change of each of a plurality of network interfaces included in the ML device, parameters of enabled network interfaces in the plurality of network interfaces. The plurality of network interfaces work on different frequency bands, and the plurality of network interfaces share antennas configured in the ML device.

It should be noted that the parameters may include at least one of capability information, an operation parameter, or the like. For example, the parameters include at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, channel bandwidth, or transmit power.

In this embodiment of this application, the status change of the network interface means that the network interface changes from an enabled state to a disabled state, or changes from a disabled state to an enabled state. When a state of a network interface changes, the status of sharing, by the plurality of network interfaces, the antennas configured in the ML device changes. In this case, the parameters of the enabled network interfaces in the plurality of network interfaces change. Therefore, the ML device may update the parameters of the enabled network interfaces, to ensure normal use of the enabled network interfaces and normal communication of the ML device.

That an ML device updates, based on a status change of each of a plurality of network interfaces included in the ML device, parameters of enabled network interfaces in the plurality of network interfaces includes: After enabling or disabling one of the plurality of network interfaces, the ML device configures parameters of each of all the enabled network interfaces of the plurality of network interfaces, and sends the parameters of all the enabled network interfaces through each of the enabled network interfaces.

In this embodiment of this application, after the ML device enables one of the plurality of network interfaces or disables one of the plurality of network interfaces, the enabled network interfaces in the plurality of network interfaces change. In this case, the status of sharing, by the plurality of network interfaces, the antennas configured in the ML device changes. Therefore, the ML device needs to reconfigure the parameters of each of all the enabled network interfaces in the plurality of network interfaces accordingly. In addition, after completing parameter configuration of the network interfaces, the ML device may further send the parameters of all the enabled network interfaces through each of the enabled network interfaces. In this way, another device that establishes a communication connection to any network interface in the ML device may obtain, from information sent by the network interface, the parameters of all the enabled network interfaces in the ML device. Therefore, the another device adjusts a communication policy of the another device in a timely manner based on the parameters of all the enabled network interfaces in the ML device. For example, the another device may establish communication connections to all the enabled network interfaces based on the parameters, or switch from a currently connected network interface to another network interface based on the parameters. This is not limited in this embodiment of this application.

According to a fifth aspect, an AP device is provided. The AP device includes a sending module, configured to: in a process in which the AP device authenticates a STA device, send a target packet to the STA device, where the AP device includes a plurality of APs, and the plurality of APs work on different frequency bands. The target packet includes a plurality of multi-band elements, the plurality of multi-band elements one-to-one correspond to the plurality of APs, each of the plurality of multi-band elements includes frequency band information of a corresponding AP, and the plurality of multi-band elements indicate the STA device to perform association and key derivation with the plurality of APs.

According to a sixth aspect, an ML device is provided. The ML device includes: a sending module, configured to: in a process in which the ML device performs FST with the other ML device, send an FST frame to the other ML device, where the FST frame includes a multi-band element. The multi-band element includes a packet-level MLA supported field, and the packet-level MLA supported field indicates whether packet-level multi-link aggregation is supported.

According to a seventh aspect, an ML device is provided. The ML device includes: a communication module, configured to: in a process in which the ML device performs packet-level multi-link aggregation with the other ML device, communicate with the other ML device by using a MAC address of an SAP of the ML device, where the SAP of the ML device corresponds to a plurality of network interfaces included in the ML device.

According to an eighth aspect, an ML device is provided. The ML device includes: an update module, configured to update, based on a status change of each of a plurality of network interfaces included in the ML device, parameters of enabled network interfaces in the plurality of network interfaces. The parameters include at least one of capability information or an operation parameter, the plurality of network interfaces work on different frequency bands, and the plurality of network interfaces share antennas configured in the ML device.

According to a ninth aspect, a computer device is provided, and the computer device is specifically an AP device. The computer device includes a processor and a memory. The memory is configured to store a program that supports the computer device to perform the multi-band communication method provided in the first aspect, and store data used to implement the multi-band communication method according to the first aspect. The processor is configured to execute the program stored in the memory. The computer device may further include a communication bus, and the communication bus is configured to establish a connection between the processor and the memory.

According to a tenth aspect, a computer device is provided, and the computer device is specifically an ML device. The computer device includes a processor and a memory. The memory is configured to: store a program that supports the computer device to perform the multi-band communication method provided in the second aspect, and store data used to implement the multi-band communication method according to the second aspect. The processor is configured to execute the program stored in the memory. The computer device may further include a communication bus, and the communication bus is configured to establish a connection between the processor and the memory.

According to an eleventh aspect, a computer device is provided, and the computer device is specifically an ML device. The computer device includes a processor and a memory. The memory is configured to: store a program that supports the computer device to perform the multi-band communication method provided in the third aspect, and store data used to implement the multi-band communication method according to the third aspect. The processor is configured to execute the program stored in the memory. The computer device may further include a communication bus, and the communication bus is configured to establish a connection between the processor and the memory.

According to a twelfth aspect, a computer device is provided, and the computer device is specifically an ML device. The computer device includes a processor and a memory. The memory is configured to store a program that supports the computer device to perform the interface parameter update method provided in the fourth aspect, and store data used to implement the interface parameter update method according to the fourth aspect. The processor is configured to execute the program stored in the memory. The computer device may further include a communication bus, and the communication bus is configured to establish a connection between the processor and the memory.

According to a thirteenth aspect, a computer-readable storage medium is provided. The computer-readable storage medium stores instructions, and when the instructions are run on a computer, the computer is enabled to perform the multi-band communication method according to the first aspect.

According to a fourteenth aspect, a computer-readable storage medium is provided. The computer-readable storage medium stores instructions, and when the instructions are run on a computer, the computer is enabled to perform the multi-band communication method according to the second aspect.

According to a fifteenth aspect, a computer-readable storage medium is provided. The computer-readable storage medium stores instructions, and when the instructions are run on a computer, the computer is enabled to perform the multi-band communication method according to the third aspect.

According to a sixteenth aspect, a computer-readable storage medium is provided. The computer-readable storage medium stores instructions, and when the instructions are run on a computer, the computer is enabled to perform the interface parameter update method according to the fourth aspect.

According to a seventeenth aspect, a computer program product including instructions is provided. When the computer program product runs on a computer, the computer is enabled to perform the multi-band communication method according to the first aspect.

According to an eighteenth aspect, a computer program product including instructions is provided. When the computer program product runs on a computer, the computer is enabled to perform the multi-band communication method according to the second aspect.

According to a nineteenth aspect, a computer program product including instructions is provided. When the computer program product runs on a computer, the computer is enabled to perform the multi-band communication method according to the third aspect.

According to a twentieth aspect, a computer program product including instructions is provided. When the computer program product runs on a computer, the computer is enabled to perform the interface parameter update method according to the fourth aspect.

According to a twenty-first aspect, a chip is provided. The chip includes a processing circuit and an interface circuit, the interface circuit is configured to receive instructions and transmit the instructions to the processing circuit, and the processing circuit is configured to perform the multi-band communication method according to the first aspect.

According to a twenty-second aspect, a chip is provided. The chip includes a processing circuit and an interface circuit, the interface circuit is configured to receive instructions and transmit the instructions to the processing circuit, and the processing circuit is configured to perform the multi-band communication method according to the second aspect.

According to a twenty-third aspect, a chip is provided. The chip includes a processing circuit and an interface circuit, the interface circuit is configured to receive instructions and transmit the instructions to the processing circuit, and the processing circuit is configured to perform the multi-band communication method according to the third aspect.

According to a twenty-fourth aspect, a chip is provided. The chip includes a processing circuit and an interface circuit, the interface circuit is configured to receive instructions and transmit the instructions to the processing circuit, and the processing circuit is configured to perform the interface parameter update method according to the fourth aspect.

Technical effects obtained in the fifth aspect, the ninth aspect, the thirteenth aspect, the seventeenth aspect, and the twenty-first aspect are similar to technical effects obtained by using corresponding technical means in the first aspect. Details are not described herein again.

Technical effects obtained in the sixth aspect, the tenth aspect, the fourteenth aspect, the eighteenth aspect, and the twenty-second aspect are similar to technical effects obtained by using corresponding technical means in the second aspect. Details are not described herein again.

Technical effects obtained in the seventh aspect, the eleventh aspect, the fifteenth aspect, the nineteenth aspect, and the twenty-third aspect are similar to technical effects obtained by using corresponding technical means in the third aspect. Details are not described herein again.

Technical effects obtained in the eighth aspect, the twelfth aspect, the sixteenth aspect, the twentieth aspect, and the twenty-fourth aspect are similar to technical effects obtained by using corresponding technical means in the fourth aspect. Details are not described herein again.

BRIEF DESCRIPTION OF DRAWINGS

FIG. 4 is a flowchart of a first multi-band communication method according to an embodiment of this application;

FIG. 5 is a flowchart of a second multi-band communication method according to an embodiment of this application;

FIG. 12 is a schematic diagram of a format of a switching stream element according to an embodiment of this application;

FIG. 13 is a flowchart of an interface parameter update method according to an embodiment of this application;

DESCRIPTION OF EMBODIMENTS

To make the objectives, technical solutions, and advantages of this application clearer, the following further describes implementations of this application in detail with reference to the accompanying drawings.

It should be understood that "a plurality of" in this application means two or more. In descriptions of this application, "/" means "or" unless otherwise specified. For example, A/B may represent A or B. In this specification, "and/or" describes only an association relationship for describing associated objects and represents that any one of three relationships may exist. For example, A and/or B may represent any one of the following three cases: Only A alone, both A and B in combination, or only B alone. In addition, to clearly describe the technical solutions of this application, words such as "first" and "second" are used to distinguish between same items or similar items whose functions are basically the same. A person skilled in the art may understand that the words such as "first" and "second" do not limit a quantity and an execution sequence, and the words such as "first" and "second" do not indicate a definite difference either.

Before embodiments of this application are described in detail, application scenarios in embodiments of this application are described first.

With development of wireless technologies, more devices support multi-band communication. For example, a device can simultaneously perform communication on a 2.4 GHz frequency band, a 5 GHz frequency band, and a 6 GHz frequency band. Even if a quantity of antennas is limited, a multi-band device can perform switching on different frequency bands, to select an optimal frequency band. This ensures communication quality of the multi-band device.

The multi-band device may be a STA device or an AP device. The STA device generally includes a plurality of STAs, and the plurality of STAs may work on different frequency bands, or work on different channels of a same frequency band. The AP device generally includes a plurality of APs, and the plurality of APs may work on different frequency bands, or work on different channels of a same frequency band. Each STA or each AP included in the multi-band device has one network interface, and the network interface may be an IEEE 802.11 interface or the like. In other words, the multi-band device includes a plurality of network interfaces.

Figure 1:
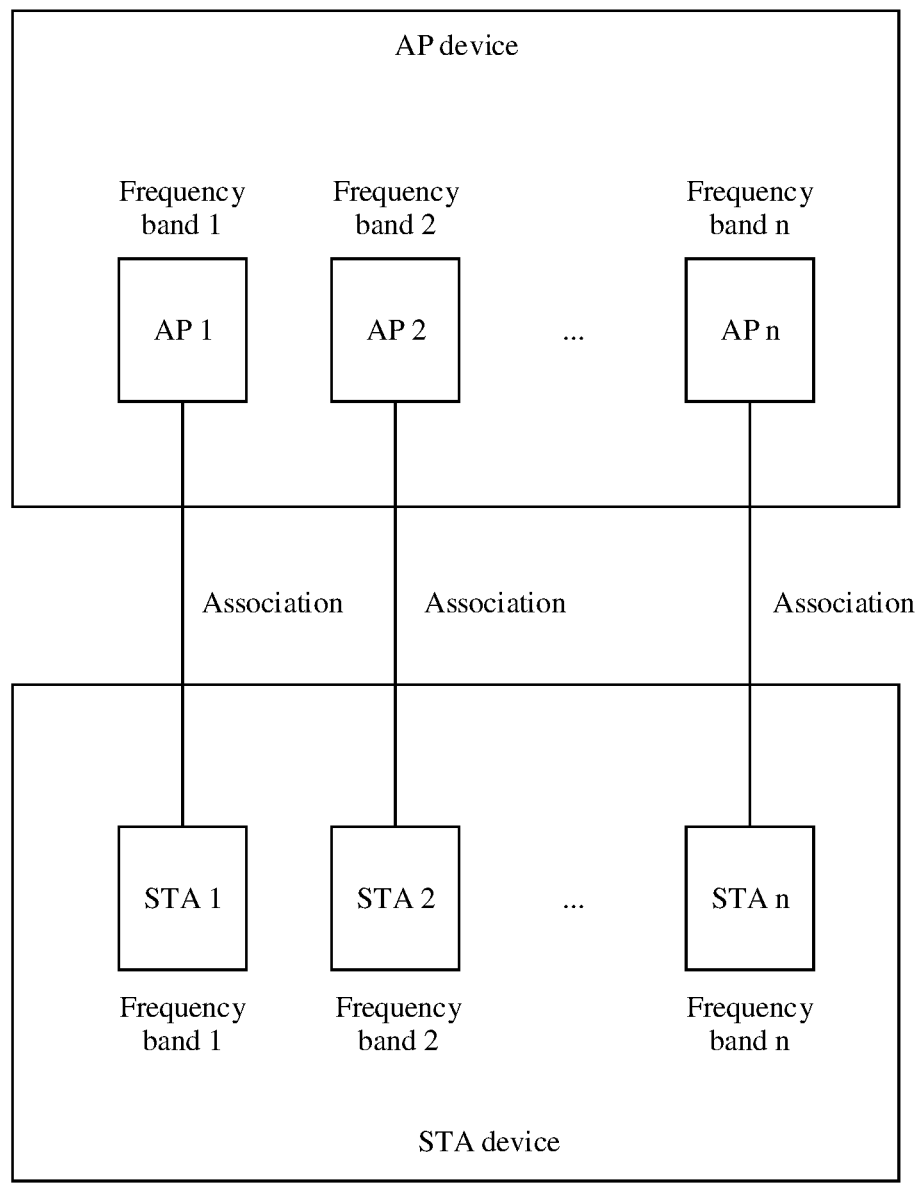
FIG. 1 is a schematic diagram of communication between a STA device and an AP device according to an embodiment of this application.

As shown in FIG. 1, if a STA device needs to communicate with an AP device, each STA in the STA device needs to be associated with a corresponding AP in the AP device. In this way, each of a plurality of STAs may establish a connection to the corresponding AP on a respective link, to implement multi-band communication between the STA device and the AP device.

The multi-band device may also be referred to as an ML device. In other words, the STA device and the AP device each may be referred to as an ML device. The ML device may perform multi-link aggregation. Multi-link aggregation means that one ML device uses a plurality of links to simultaneously send data, to improve a transmission rate.

The following describes concepts related to multi-link aggregation.

On one hand, multi-link aggregation may be classified into flow-level multi-link aggregation and packet-level multi-link aggregation. Flow-level multi-link aggregation means that one ML device uses a plurality of links to simultaneously send data packets with different traffic identifiers (TID). Packet-level multi-link aggregation means that one ML device uses a plurality of links to simultaneously send data packets with a same TID. A TID may identify a service type to which a data packet belongs.

For packet-level multi-link aggregation, all links on which packet-level multi-link aggregation is performed in one ML device form a multi-link entity (ML-entity), and each ML-entity corresponds to one multi-link service access point (ML-SAP). In other words, a plurality of network interfaces used for packet-level multi-link aggregation in one ML device correspond to one ML-SAP. Each ML-SAP has one MAC address. The MAC address may be newly allocated, or may be the same as a MAC address of one of a plurality of network interfaces corresponding to the ML-SAP.

Figure 2:
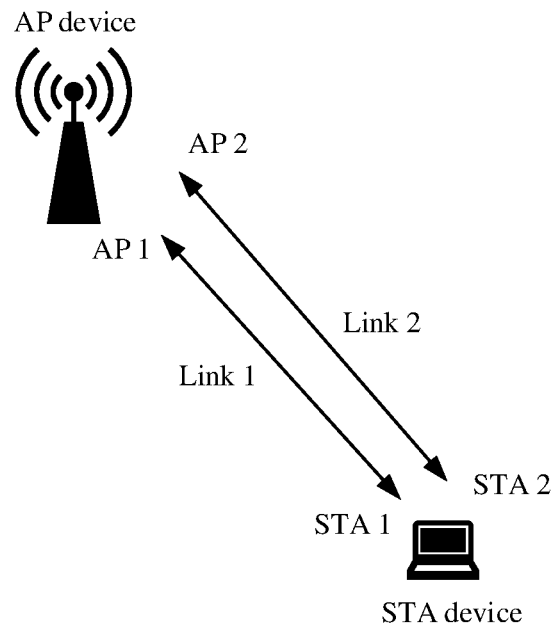
FIG. 2 is a schematic diagram of collocated multi-link aggregation according to an embodiment of this application.
Figure 3:
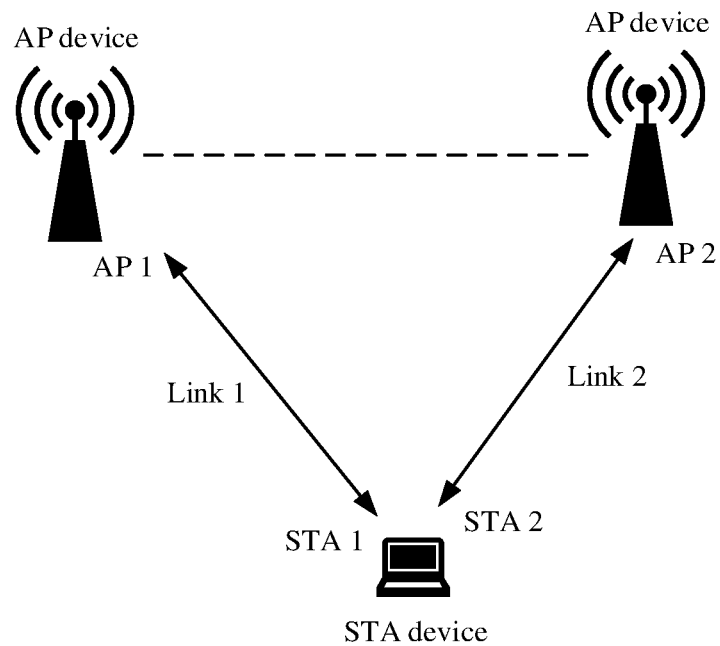
FIG. 3 is a schematic diagram of non-collocated multi-link aggregation according to an embodiment of this application.

On the other hand, multi-link aggregation may be classified into collocated multi-link aggregation and non-collocated multi-link aggregation. As shown in FIG. 2, collocated multi-link aggregation means that APs corresponding to a plurality of STAs on which multi-link aggregation is performed in a STA device belong to a same physical device. As shown in FIG. 3, non-collocated multi-link aggregation means that APs corresponding to a plurality of STAs on which multi-link aggregation is performed in a STA device belong to different physical devices.

The following describes a fast session transition (FST) mechanism.

The IEEE 802.11 protocol defines the FST mechanism, which is used to switch transmission of data packets with a TID or all TIDs of an ML device from a frequency band to another frequency band. Specifically, the FST mechanism includes two modes: a transparent mode and a nontransparent mode. The transparent mode means that a plurality of network interfaces included in each of two ML devices at two ends of a link use a same MAC address. The nontransparent mode means that a plurality of network interfaces included in each of or one of two ML devices at two ends of a link use different MAC addresses.

The following describes a multi-band communication method provided in an embodiment of this application.

FIG. 4 is a flowchart of a multi-band communication method according to an embodiment of this application. Refer to FIG. 4. The method includes the following step.

Step 401: In a process in which an AP device authenticates a STA device, the AP device sends a target packet to the STA device.

It should be noted that, that the AP device authenticates the STA device means that the AP device performs identity authentication on the STA device at a link layer. Identity authentication generally includes association and key derivation. In an association process, the STA device may send an association request frame to the AP device, and then the AP device may send an association response frame to the STA device. In a key derivation process, the STA device and the AP device may send a plurality of key messages to each other to agree upon a key, and the key is used to protect communication data transmitted between the STA device and the AP device.

In addition, the AP device may be an ML device. In other words, the AP device may simultaneously work on a plurality of frequency bands. For example, the AP device may include a plurality of APs, the plurality of APs work on different frequency bands, and MAC addresses of the plurality of APs may be different. For example, the AP device includes an AP 1, an AP 2, and an AP 3. The AP 1 may work on a 2.4 GHz frequency band, the AP 2 may work on a 5 GHz frequency band, and the AP 3 may work on a 6 GHz frequency band. A MAC address of an AP may be a MAC address of a network interface of the AP.

In addition, the STA device may be a device that supports a plurality of frequency bands. In a possible case, the STA device is a single-link (SL) device, and can work on only one frequency band at a moment. The STA device may switch among the plurality of APs included in the AP device. For example, the STA device may dynamically switch among the plurality of APs based on a service delay requirement. In another possible case, the STA device is an ML device. In other words, the STA device may simultaneously work on a plurality of frequency bands. The STA device may include a plurality of STAs, the plurality of STAs work on different frequency bands, and MAC addresses of the plurality of STAs may be different. A MAC address of a STA may be a MAC address of a network interface of the STA.

It should be noted that the target packet includes a plurality of multi-band elements, the plurality of multi-band elements one-to-one correspond to the plurality of APs included in the AP device, each of the plurality of multi-band elements includes frequency band information of a corresponding AP, and the plurality of multi-band elements indicate the STA device to perform association and key derivation with the plurality of APs. Frequency band information of an AP is related information of a frequency band on which the AP works, and association and key derivation may be performed with the AP based on the frequency band information of the AP.

It should be noted that in this embodiment of this application, the AP device may include the plurality of multi-band elements in the target packet sent to the STA device, to send, to the STA device, related information about the frequency bands on which the plurality of APs included in the AP device work, and indicate the STA device to perform association and key derivation with the plurality of APs. In this way, the STA device can quickly switch among the plurality of APs.

In a possible implementation, the target packet may be an association response frame generated in the association process, and/or the target packet may be a key message generated in the key derivation process.

Optionally, when the target packet is the key message generated in the key derivation process, the target packet may further include a robust security network information element (RSN IE), and the robust security network information element includes a request type. For example, a value of a reserved bit of the robust security network information element may be the request type.

It should be noted that the request type may include a single-link association type and a corresponding key derivation type, or the request type may include a multi-link association type and a corresponding key derivation type. The single-link association type means that single-link association may be performed with the AP device, the multi-link association type means that multi-link association may be performed with the AP device, and the key derivation type indicates an encryption protocol that can be used when key derivation is performed with the AP device.

The following describes a case in which the STA device is the ML device. A plurality of STAs on which multi-link aggregation is performed in the STA device correspond to one ML-SAP (which may be referred to as a first SAP). A plurality of APs on which multi-link aggregation is performed in the AP device correspond to one ML-SAP (which may be referred to as a second SAP).

The association request frame sent by the STA device to the AP device may include a first information element (IE), and the first information element may include a MAC address of the first SAP. Alternatively, an address field in a frame header of the association request frame sent by the STA device to the AP device includes the MAC address of the first SAP.

The association response frame sent by the AP device to the STA device may include a second information element, and the second information element may include a MAC address of the second SAP. Alternatively, an address field in a frame header of the association response frame sent by the AP device to the STA device includes the MAC address of the second SAP.

It should be noted that the MAC address of the first SAP is used to generate a key in the key derivation process, and the key may be used on all links in an ML-entity corresponding to the first SAP. The MAC address of the second SAP is used to generate a key in the key derivation process, and the key may be used on all links in an ML-entity corresponding to the second SAP.

In addition, the first information element may further include indication information indicating an encryption algorithm preferentially used by the STA device, and/or the first information element may further include a MAC address of each of the plurality of STAs. The second information element may further include indication information indicating an encryption algorithm preferentially used by the AP device, and/or the second information element may further include a MAC address of each of the plurality of APs.

It should be noted that when the association request frame includes the MAC address of the first SAP and the MAC address of each of the plurality of STAs, the MAC address of the first SAP is used to generate an encryption key of a unicast data frame in the key derivation process, and the MAC address of each STA is used to generate an encryption key of a multicast data frame in the key derivation process. When the association response frame includes the MAC address of the second SAP and the MAC address of each of the plurality of APs, the MAC address of the second SAP is used to generate the encryption key of the unicast data frame in the key derivation process, and the MAC address of each AP is used to generate the encryption key of the multicast data frame in the key derivation.

It should be noted that in this embodiment of this application, the STA device and the AP device may agree upon, based on the MAC address of the first SAP, the MAC address of the second SAP, the encryption algorithm preferentially used by the STA device, the encryption algorithm preferentially used by the AP device, the MAC address of each of the plurality of STAs, and the MAC address of each of the plurality of APs that are obtained in the association process, a key in the key derivation process, so that key agreement efficiency can be improved.

The following describes a case in which the STA device is the SL device. A plurality of APs on which multi-link aggregation is performed in the AP device correspond to one ML-SAP (which may be referred to as a second SAP).

The association request frame sent by the STA device to the AP device includes a third information element, the third information element includes multi-AP association indication information, and the multi-AP association indication information is used to request to simultaneously perform association and key derivation with the plurality of APs.

The association response frame sent by the AP device to the STA device includes a second information element, and the second information element includes a MAC address of the second SAP; or an address field in a frame header of the association response frame sent by the AP device to the STA device includes a MAC address of the second SAP.

In addition, the second information element may further include indication information indicating an encryption algorithm preferentially used by the AP device, and/or the second information element may further include a MAC address of each of the plurality of APs.

It should be noted that when the AP device includes the multi-AP association indication information in the association request frame sent by the STA device, it indicates that the STA device expects to simultaneously perform association and key derivation with the plurality of APs in the AP device. In this case, the AP device may include the MAC address of the second SAP in the association response frame returned to the STA device, may further include the MAC address of each of the plurality of APs in the association response frame and indication information indicating the encryption algorithm preferentially used by the AP device. In this way, the STA device may subsequently complete key derivation with the plurality of APs based on the MAC address of the second SAP, the MAC address of each of the plurality of APs, and the encryption algorithm preferentially used by the AP device.

It should be noted that for the STA device, fast switching may reduce a switching delay. However, for the AP device, if the STA device is allowed to perform random switching among the plurality of APs, quality of service (QoS) of another STA device is degraded. Therefore, the AP device may include an access control policy information element (Access Control Policy IE) in a beacon frame sent by each of the plurality of APs. The access control policy information element may include one or more pieces of indication information. The one or more pieces of indication information may include at least one of a quantity of the plurality of APs, an access policy of each of the plurality of APs, switching threshold indication information, STA association restriction, or the like.

It should be noted that for any one of the plurality of APs, an access policy of the AP may include at least one of a service policy, timeout information, or the like. The service policy indicates a highest AC or a TID of a data packet and that is allowed by the AP to transmit. The timeout information indicates the STA device to perform AP switching when the STA device does not receive, within a preset duration, a data packet that is of a highest AC or a TID and that is allowed by the AP to transmit. The preset duration may be preset. For example, the preset duration may be 5 minutes.

In addition, the switching threshold indication information indicates the STA device to perform AP switching when signal quality decreases to a first threshold. The first threshold may be preset. When the signal quality decreases to the first threshold, it indicates that the signal quality is poor. The signal quality may be measured in a plurality of manners. For example, the signal quality may be measured by using a received signal strength indicator (RSSI) value. This is not limited in this embodiment of this application.

In addition, the STA association restriction indicates a type of a STA that is allowed to be associated with each of the plurality of APs. The type of the STA may include an HT model, a VHT model, an HE model, an EHT model, whether a plurality of frequency bands are supported, whether a plurality of frequency bands are not supported, and the like. This is not limited in this embodiment of this application.

In this embodiment of this application, the AP device includes the plurality of APs, and the plurality of APs work on the different frequency bands. In the process in which the AP device authenticates the STA device, the AP device may send, to the STA device, the target packet that includes the plurality of multi-band elements, to send, to the STA device, the related information about the frequency bands on which the plurality of APs included in the AP device work, and indicate the STA device to perform association and key derivation with the plurality of APs. In this way, the STA device can quickly switch among the plurality of APs.

FIG. 5 is a flowchart of a multi-band communication method according to an embodiment of this application. Refer to FIG. 5. The method includes the following step.

Step 501: In a process in which two ML devices perform FST, one ML device sends an FST frame to the other ML device, where the FST frame includes a multi-band element.

It should be noted that the multi-band element includes a packet-level multi-link aggregation supported (packet-level MLA supported) field, and the packet-level MLA supported field indicates whether packet-level multi-link aggregation is supported. In this way, after the ML device sends the FST frame to the other ML device, the other ML device may learn whether the ML device supports packet-level multi-link aggregation.

In addition, the FST frame may be a data frame, a control frame, a management frame, or the like sent by the two ML devices to each other in the process in which the two devices perform FST. For example, the FST frame may be an FST setup request frame, an FST setup response frame, an FST teardown frame, an FST acknowledgment request (FST ACK Request) frame, or an FST acknowledgment response (FST ACK Response) frame.

Figure 6:
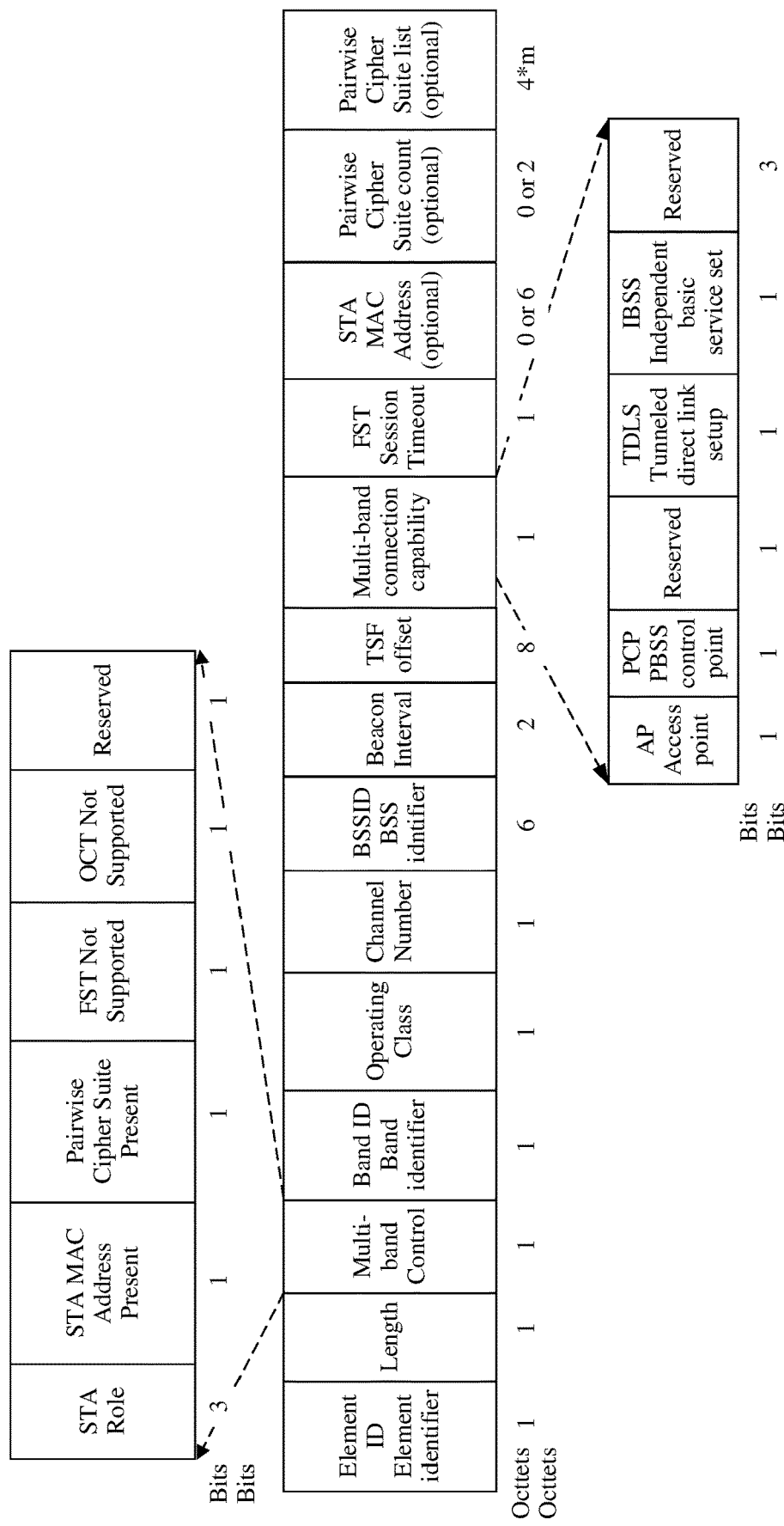
FIG. 6 is a schematic diagram of a format of a multi-band element included in an FST frame according to a related technology.

It should be noted that an FST mechanism in the related technology has already supported flow-level multi-link aggregation, but does not support packet-level multi-link aggregation. For example, FIG. 6 is a schematic diagram of a format of a multi-band element included in an FST frame according to a related technology. As shown in FIG. 6, the multi-band element may include a plurality of fields such as an element identifier (Element ID) field, a length field, a multi-band control field, a band identifier (Band ID) field, an operating class field, a channel number field, a basic service set (BSS) identifier (BSSID) field, a beacon interval field, a timing synchronization function (TSF) offset (TSF offset) field, a multi-band connection capability field, an FST session timeout field, a STA MAC address field, a pairwise cipher suite count field, and a pairwise cipher suite list field. The multi-band control field may include information such as a STA role, STA MAC address present, pairwise cipher suite present (FST) not supported (FST Not Supported), and on-channel tunneling (OCT) not supported (OCT Not Supported). The multi-band connection capability field may include information such as an AP, a personal basic service set (Personal BSS, PBSS) control point (namely, a PBSS control point (PCP)), tunneled direct link setup (TDLS), and an independent basic service set (IBSS).

In this embodiment of this application, the FST mechanism in the related technology is expanded, to newly define an operation signaling indication for packet-level multi-link aggregation. In other words, the packet-level MLA supported field is added to the multi-band element, to indicate whether packet-level multi-link aggregation is supported. In this way, the two ML devices that perform FST may learn whether each other supports packet-level multi-link aggregation, and perform FST based on whether each other supports packet-level multi-link aggregation, so that the two devices complete FST more quickly and accurately.

In a possible implementation, one of the two ML devices is a STA device, and the other ML device is an AP device. The multi-band element in the FST frame sent by the STA device to the AP device includes a non-collocated supported field, and the non-collocated supported field indicates whether non-collocated multi-link aggregation is supported.

In this embodiment of this application, the non-collocated supported field may be further added to the multi-band element, to indicate whether non-collocated multi-link aggregation is supported. In other words, the STA device may include the non-collocated supported field in the multi-band element in the FST frame sent to the AP device, to indicate whether the STA device supports multi-link aggregation with a plurality of APs that belong to different physical devices. In this way, the AP device can accordingly adjust a communication policy between the AP device and the STA device.

In another possible implementation, one of the two ML devices is a STA device, the other ML device is an AP device, and the FST frame sent by the STA device to the AP device includes a mobility domain element. The mobility domain element includes a non-collocated supported field, and the non-collocated supported field indicates whether non-collocated multi-link aggregation is supported. Alternatively, the mobility domain element includes a non-collocated flow-level multi-link aggregation supported (non-collocated flow-level MLA supported) field and a non-collocated packet-level multi-link aggregation supported (non-collocated packet-level MLA supported) field. The non-collocated flow-level MLA supported field indicates whether non-collocated multi-link aggregation is supported when flow-level multi-link aggregation is performed, and the non-collocated packet-level MLA supported field indicates whether non-collocated multi-link aggregation is supported when packet-level multi-link aggregation is performed.

In this embodiment of this application, the non-collocated supported field may be added to the mobility domain element in the FST frame, to indicate whether non-collocated multi-link aggregation is supported. In other words, the STA device may include the non-collocated supported field in the mobility domain element in the FST frame sent to the AP device, to indicate whether the STA device supports multi-link aggregation with a plurality of APs that belong to different physical devices. In this way, the AP device can accordingly adjust a communication policy between the AP device and the STA device.

Alternatively, in this embodiment of this application, the non-collocated flow-level MLA supported field and the non-collocated packet-level MLA supported field may be added to the mobility domain element in the FST frame, to separately indicate whether non-collocated multi-link aggregation is supported when flow-level multi-link aggregation and packet-level multi-link aggregation are performed. In other words, the STA device may include the non-collocated flow-level MLA supported field and the non-collocated packet-level MLA supported field in the mobility domain element in the FST frame sent to the AP device, to separately indicate whether the STA device supports multi-link aggregation with a plurality of APs that belong to different physical devices when flow-level multi-link aggregation and packet-level multi-link aggregation are performed. In this way, the AP device can accordingly adjust a communication policy between the AP device and the STA device.

In still another possible implementation, one of the two ML devices is the STA device, and the other ML device is the AP device. The multi-band element in the FST frame sent by the AP device to the STA device includes a multi-band connection capability field, the multi-band connection capability field includes a non-collocated access point (non-collocated AP) indication bit, and the non-collocated AP indication bit indicates whether multi-link aggregation with an AP that belongs to another physical device is supported.

In this embodiment of this application, the non-collocated AP indication bit may be further added to the multi-band connection capability field in the multi-band element, to indicate whether multi-link aggregation with the AP that belongs to the another physical device is supported. In other words, the AP device may include the non-collocated AP indication bit in the multi-band connection capability field in the multi-band element in the FST frame sent to the STA device, to indicate whether an AP in the AP device supports multi-link aggregation with the AP that belongs to the another physical device. In this way, the STA device can accordingly adjust the communication policy between the STA device and the AP device.

In addition, the multi-band element may further include a first flag bit, and the first flag bit indicates whether the multi-band element includes a link identity field. Specifically, when a value of the first flag bit is a preset value (for example, 1), the multi-band element includes the link identity field; and when the value of the first flag bit is not the preset value, the multi-band element does not include the link identity field. The link identity field indicates a frequency band to which the two ML devices need to transfer an FST session. In other words, the value of the link identity field is used to identify the frequency band to which the two ML devices need to transfer the FST session.

In addition, the multi-band element may further include a second flag bit, and the second flag bit indicates whether the multi-band element includes a multi-band control field. Specifically, when a value of the second flag bit is a preset value (for example, 1), the multi-band element includes the multi-band control field; and when the value of the second flag bit is not the preset value, the multi-band element does not include the multi-band control field. The multi-band control field may include the packet-level MLA supported field, the non-collocated supported field, the link identity field, and the like.

In this embodiment of this application, in the process in which the two ML devices perform FST, one ML device sends the FST frame to the other ML device. The FST frame includes the multi-band element, the multi-band element includes the packet-level MLA supported field, and the packet-level MLA supported field indicates whether packet-level multi-link aggregation is supported. In this way, the two ML devices that perform FST may learn whether each other supports packet-level multi-link aggregation, and perform FST based on whether each other supports packet-level multi-link aggregation, so that the two devices complete FST more quickly and accurately.

Figures 7, 8:
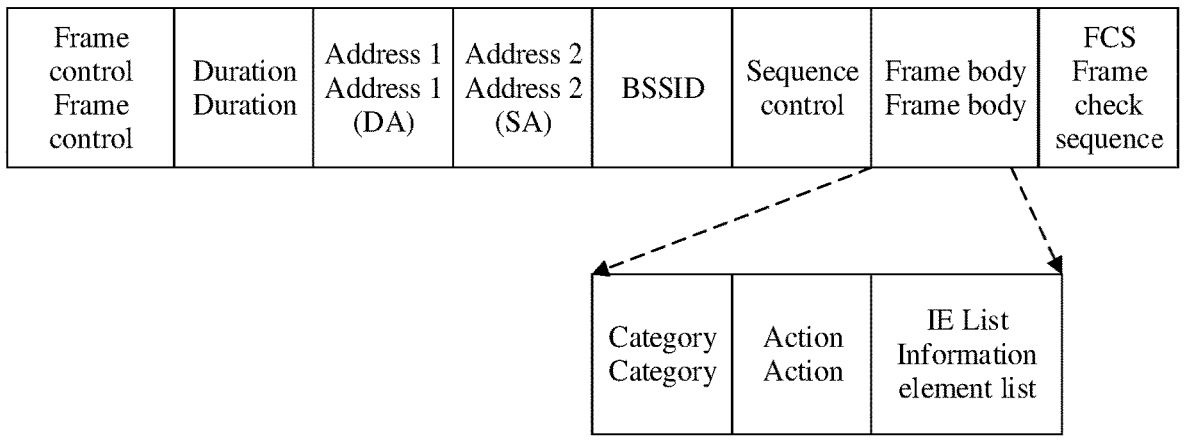
FIG. 7 is a flowchart of a third multi-band communication method according to an embodiment of this application.
FIG. 8 is a schematic diagram of a format of an action frame according to a related technology.

FIG. 7 is a flowchart of a multi-band communication method according to an embodiment of this application. Refer to FIG. 7. The method includes the following step:

Step 701: In a process in which two ML devices perform packet-level multi-link aggregation, the two ML devices communicate with each other by using MAC addresses of their respective SAPs.

It should be noted that for any one of the two ML devices, an SAP of the ML device corresponds to a plurality of network interfaces included in the ML device. In other words, the SAP of the ML device is one ML-SAP corresponding to a plurality of network interfaces on which packet-level multi-link aggregation is performed in the ML device. A MAC address of the SAP of the ML device may be a newly allocated MAC address, or may be a MAC address of one of the plurality of network interfaces.

Optionally, in a communication process of the two ML devices, an address field of a data frame sent by one of the two ML devices to the other ML device includes a MAC address of an SAP of the other ML device. The MAC address indicates that the data frame is used to perform an operation on a plurality of network interfaces corresponding to the SAP of the other ML device.

Optionally, in a first possible implementation, in the communication process of the two ML devices, an address field of a control frame sent by one of the two ML devices to the other ML device includes the MAC address of the SAP of the other ML device or a MAC address of one network interface of the other ML device, and an address field of a management frame sent by the ML device to the other ML device includes the MAC address of the SAP of the other ML device or the MAC address of the one network interface of the other ML device.

It should be noted that when the address field of the control frame includes the MAC address of the SAP of the other ML device, it indicates that the control frame is used to perform an operation on the plurality of network interfaces corresponding to the SAP of the other ML device. When the address field of the control frame includes the MAC address of the one network interface of the other ML device, it indicates that the control frame is used to perform an operation on the one network interface of the other ML device. Similarly, when the address field of the management frame includes the MAC address of the SAP of the other ML device, it indicates that the management frame is used to perform an operation on the plurality of network interfaces corresponding to the SAP of the other ML device. When the address field of the management frame includes the MAC address of the one network interface of the other ML device, it indicates that the management frame is used to perform an operation on the one network interface of the other ML device.

In a second possible implementation, in the communication process of the two ML devices, address fields in a control frame and a management frame that are sent by one of the two ML devices to the other ML device both include a MAC address of one network interface of the other ML device. In this case, both the control frame and the management frame are used to perform an operation on the one network interface of the other ML device.

In a third possible implementation, in the communication process of the two ML devices, an address field of a specified control frame sent by one of the two ML devices to the other ML device includes the MAC address of the SAP of the other ML device, and an address field in a management frame sent by the ML device to the other ML device and an address field in a control frame other than the specified control frame both include a MAC address of one network interface of the other ML device. The specified control frame may be preset. In this case, the specified control frame is used to perform an operation on the plurality of network interfaces corresponding to the SAP of the other ML device. Both the management frame and the control frame other than the specified control frame are used to perform an operation on the one network interface of the other ML device.

It should be noted that in this embodiment of this application, one link is allowed to belong to a plurality of multi-link entities (ML-entity). In other words, one network interface may correspond to a plurality of ML-entities. In this case, in addition to having a MAC address (namely, a MAC address of an ML-SAP corresponding to each ML-entity), each ML-entity is allocated with a multi-link entity identifier, and the multi-link entity identifier may be used in other phases other than a multi-link aggregation setup (MLA setup) phase.

For example, in the communication process of the two ML devices, a frame header of the control frame sent by one of the two ML devices to the other ML device may include an aggregation control (A-Control) field. The aggregation control field may include a multi-link entity identifier and control information, to indicate to perform an operation indicated by the control information on a plurality of network interfaces corresponding to an ML-entity indicated by the multi-link entity identifier.

The following describes a format of an action frame in a management frame provided in the related technology. For example, FIG. 8 is a schematic diagram of a format of an action frame according to a related technology. As shown in FIG. 8, the action frame includes fields such as a frame control field, a duration field, an address 1 (destination address (DA)) field, an address 2 (sender address (SA)) field, a BSSID field, a sequence control field, a frame body field, and a frame check sequence (FCS) field. The frame body field may include fields such as a category field, an action field, and an information element list (IE List) field.

In a possible implementation, in this embodiment of this application, in the communication process of the two ML devices, an action frame sent by one of the two ML devices to the other ML device includes a category field, and a value of the category field is the same as a value of a category field included in an FST frame. In this case, the action frame and the FST frame in this embodiment of this application share one category value, so that a multi-link aggregation operation can be implemented by using the FST mechanism.

Certainly, in actual application, the action frame in this embodiment of this application and the FST frame may have different category values. In this case, both a flow-level multi-link aggregation operation and a packet-level multi-link aggregation operation need to be redefined. In this case, implementation of the multi-link aggregation operation does not depend on the FST mechanism, and a newly defined multi-link aggregation operation may be used to further improve the FST mechanism. For example, for flow-level multi-link aggregation, both a transparent mode and a non-transparent mode may be supported; and for packet-level multi-link aggregation, only the transparent mode may be supported. In particular, there is a possibility that non-collocated multi-link aggregation can only be initiated by a STA.

It should be noted that the action frame provided in this embodiment of this application may be referred to as a multi-link aggregation action frame (MLA Action frame). The following provides related design of implementing the action frame based on the FST mechanism. For example, a format of the action frame may be shown in the following Table 1:

TABLE 1

| Order (Order) | Information (Information) |
|---|---|
| 1 | Category field |
| 2 | FST action field |
| ... | ... |

When values of the FST action field are different, fixed fields and information elements included in the action frame are also different. For example, meanings corresponding to different values of the FST action field may be shown in the following Table 2:

TABLE 2

| FST action field | Meaning |
|---|---|
| 0 | FST setup request |
| 1 | FST setup response |
| 2 | FST teardown |
| 3 | FST ACK request |
| 4 | FST ACK response |
| 5 | On-channel tunnel request (On-channel tunnel request) |
| 6 | MLA setup request (multi-link setup request) |
| 7 | MLA setup response (multi-link setup response) |
| ... | ... |

It should be noted that in this embodiment of this application, only Table 1 and Table 2 are used as examples to describe the format of the action frame, and Table 1 and Table 2 constitute no limitation on this embodiment of this application.

When the action frame is the multi-link aggregation setup request frame or the multi-link aggregation setup response frame, the action frame may include a fourth information element, and the fourth information element indicates the multi-link entity information. In this way, in a multi-link aggregation setup process, the ML device may quickly and accurately perform multi-link aggregation setting based on the multi-link entity information included in the fourth information element.

Figure 9:
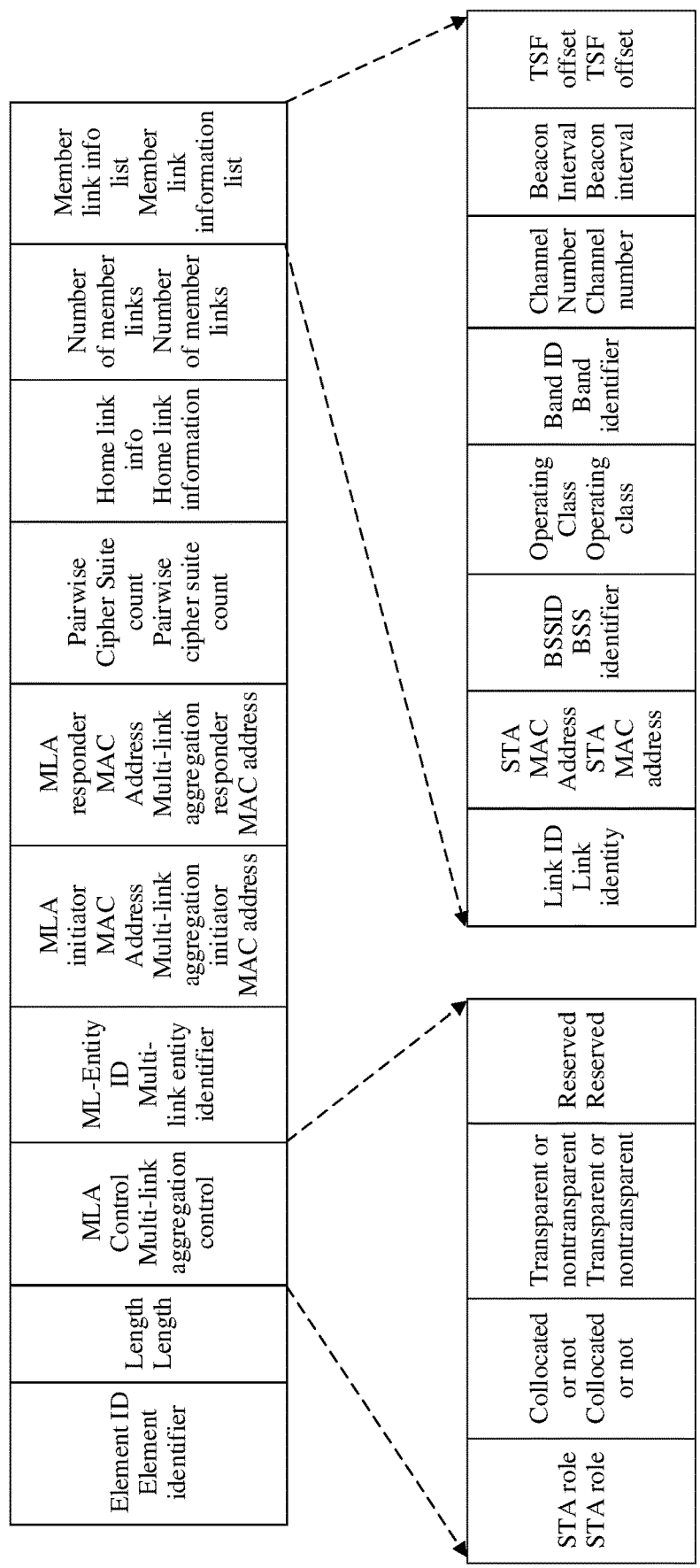
FIG. 9 is a schematic diagram of a format of a fourth information element according to an embodiment of this application.

For example, FIG. 9 is a schematic diagram of a format of a fourth information element according to an embodiment of this application. As shown in FIG. 9, the fourth information element may include fields such as an element identifier (Element ID) field, a length field, a multi-link aggregation control (MLA Control) field, a multi-link entity identifier (ML-entity ID) field, a multi-link aggregation initiator MAC address (MLA initiator MAC address) field, a multi-link aggregation responder MAC address (MLA responder MAC address) field, a pairwise cipher suite count field, a home link information (Home link info) field, a number of member links field, and a member link information list (Member link info list) field. The MLA control field may include fields such as a STA rolefield, a collocated or not field, and a transparent or non-transparent mode field. The member link info list field may include fields such as a link identity (Link ID) field, a STA MAC address field, a BSS identifier (BSSID) field, an operating class field, a band identifier (Band ID) field, a channel number field, a beacon interval field, and a TSF offset field.

Specifically, the collocated or not field indicates whether specified multi-link aggregation is collocated multi-link aggregation or non-collocated multi-link aggregation. The MLA initiator MAC address field and the MLA responder MAC address field indicate MAC addresses of SAPs of two ML devices at two ends of a link. The home link info field indicates a home link of an ML-entity, and is used to restrict multi-link aggregation management to be performed through the home link, or may restrict a block acknowledgment request (Block ACK Request, BAR)/block acknowledgment (Block ACK, BA) operation to be performed only through the home link. The number of member links field indicates a quantity of member links included in an ML-entity. The member link info list field indicates information about each component link. The member link info list field may include a plurality of link info fields, and each link info field indicates information about one component link. Specifically, the member link info list field may be indicated by including a plurality of existing multi-band elements, or may be indicated by newly defining an extended multi-band element, or may be indicated by newly defining an extended multi-band element and combining the extended multi-band element with existing multi-band elements, or may be indicated by including an indication bit indicating whether the member link info list field includes a specific multi-band element.

In another possible implementation, the collocated or not field may not be carried in a multi-link aggregation control field, but a collocated transparent or not field is carried in each link info field. The collocated transparent or not field indicates whether an AP supports a transparent mode in collocated multi-link aggregation, and indicate whether multi-link aggregation is set to a transparent mode or a nontransparent mode. When multi-link aggregation is set to the transparent mode, each link info field may not include address information of two ends of a member link. When multi-link aggregation is not set to the transparent mode, each link info field needs to include the address information of the two ends of the member link. In addition, each link info field may further include an indication bit indicating whether, in the transparent mode, a MAC address of an ML-SAP corresponding to the member link is the same as MAC addresses of network interfaces. If the MAC address of the ML-SAP corresponding to the member link is the same as the MAC addresses of the network interfaces, each link info field only needs to include the MAC address of the ML-SAP corresponding to the member link. If the MAC address of the ML-SAP corresponding to the member link is different from the MAC addresses of the network interfaces, each link info field needs to include both the MAC address of the ML-SAP corresponding to the member link and the MAC addresses of the plurality of network interfaces corresponding to the ML-SAP corresponding to the member link.

For the number of pairwise cipher suite field and the pairwise cipher suite list field, in the transparent mode, the two fields may be directly carried in the fourth information element; and in the nontransparent mode, the two fields may not be carried in the fourth information element, but are carried in each link info field.

For the MLA initiator MAC address field and the MLA responder MAC address field, the two fields may not be carried in the fourth information element, but are directly carried after the FST action field in the action frame.

In addition, the fourth information element may further include indication information indicating an operation mode of member links of the ML-entity, where the operation mode may be an asynchronous mode or a synchronous mode. If the operation mode is the synchronous mode, the fourth information element may further include indication information indicating whether corresponding transmission is a single presentation protocol data unit (PPDU) or a plurality of independent PPDUs.

It should be noted that similar to the FST mechanism, the multi-link aggregation operation allows a session to be switched from one ML-entity to another ML-entity as a whole. Therefore, a multi-link aggregation session transition element (MLA session Transition element) is newly defined, and the multi-link aggregation session transition element may be carried in the action frame.

Figure 10:
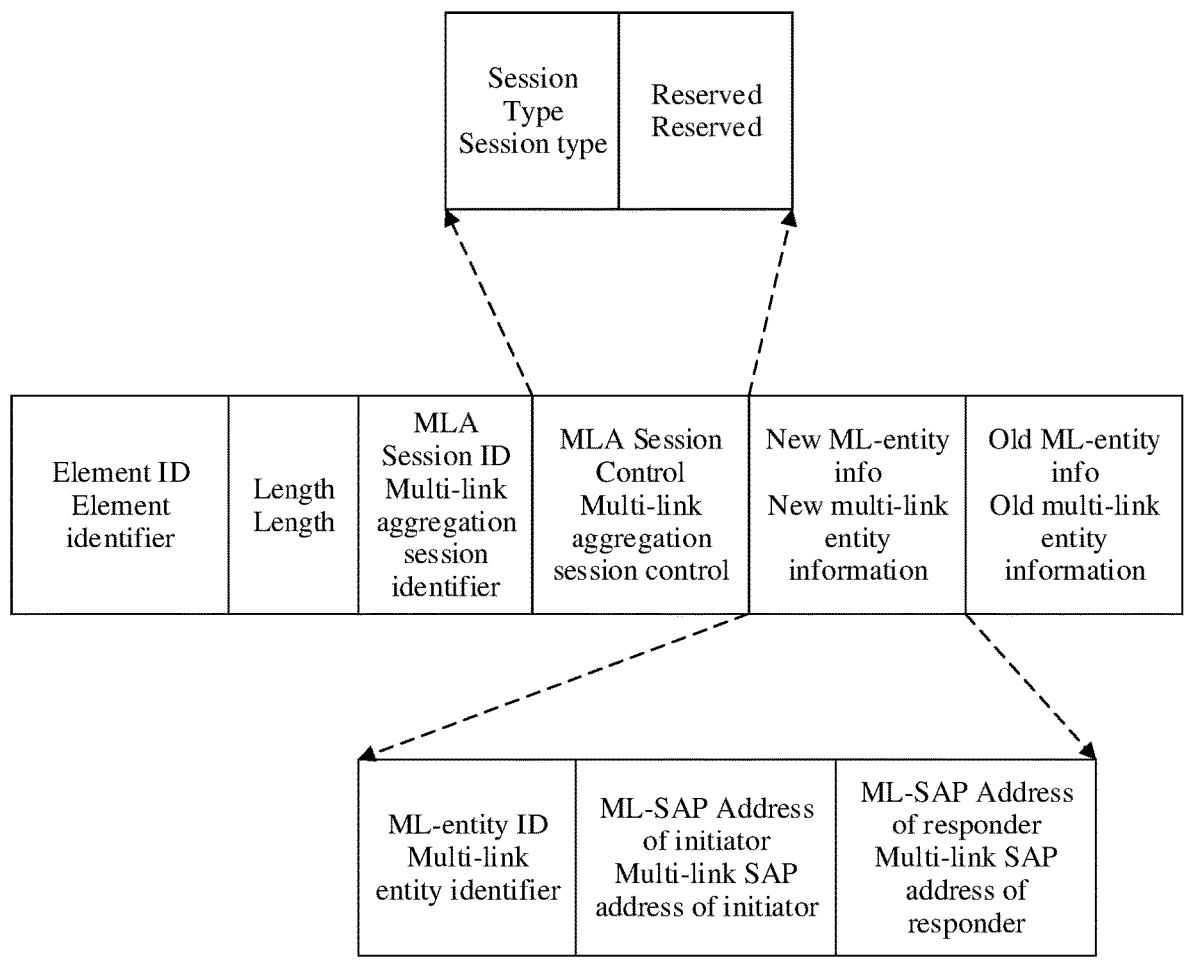
FIG. 10 is a schematic diagram of a format of a multi-link aggregation session transition element according to an embodiment of this application.

For example, a format of the multi-link aggregation session transition element may be shown in FIG. 10. The multi-link aggregation session transition element may include fields such as an element identifier (Element ID) field, a length field, a multi-link aggregation session identifier (MLA Session ID) field, a multi-link aggregation session control (MLA Session Control) field, a new multi-link entity information (New ML-entity info) field, and an old multi-link entity information (Old ML-entity info) field. The MLA session control field includes a session type field. The new ML-entity info field includes fields such as a multi-link entity identifier (ML-entity ID) field, a multi-link SAP address of initiator (ML-SAP Address of initiator) field, and a multi-link SAP address of responder (ML-SAP Address of responder) field. A multi-link entity identifier may be a separately set identifier or may be a MAC address of an ML-SAP corresponding to the multi-link entity.

In addition, similar to the FST mechanism, the multi-link aggregation operation may also switch a data stream in an ML-entity to another ML-entity. Therefore, a multi-link aggregation switching stream element (MLA Switching stream element) is newly defined, and the multi-link aggregation switching stream element may be carried in the action frame.

Figure 11:
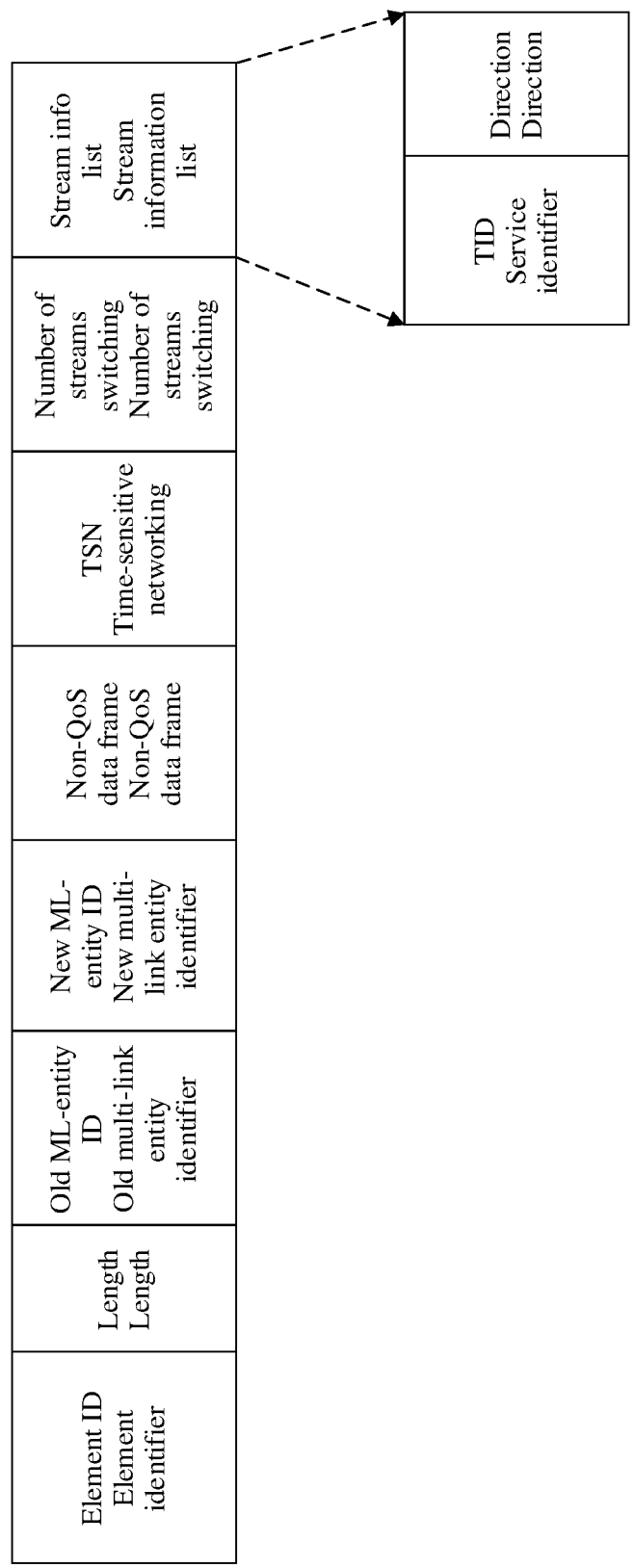
FIG. 11 is a schematic diagram of a format of a multi-link aggregation switching stream element according to an embodiment of this application.

For example, a format of the multi-link aggregation switching flow element may be shown in FIG. 11. The multi-link aggregation switching stream element includes fields such as an element identifier (Element ID) field, a length field, an old multi-link entity identifier (Old ML-entity ID) field, a new multi-link entity identifier (New ML-entity ID) field, a non-QoS data frame field, a time-sensitive networking (TSN) field, a number of streams switching field, and a stream information list (Stream info list) field. The stream info list field may include fields such as a service identifier (SID) field, and a direction field. The direction field may be a 1-bit indication, and indicates whether unidirectional TID switching is performed from an initiator to a responder, or bidirectional TID switching is performed from the initiator to the responder. Alternatively, the direction field may be a 2-bit indication, and indicates whether unidirectional TID switching is performed from the initiator to the responder, or unidirectional TID switching is performed from the responder to the initiator, or bidirectional TID switching is performed from the initiator to the responder.

In addition, devices at two ends of a link may create a plurality of ML-entities at one time, and include a plurality of fourth information elements and a newly-defined stream steering element in the action frame. The stream steering element indicates a TID of a packet carried by each ML-entity.

For example, a format of the stream steering element may be shown in FIG. 12. The stream steering element may include fields such as an element identifier (Element ID) field, a length field, a number of multi-link entities (Number of ML-entities) field, a multi-link entity identifier (ML-entity ID) field, and a traffic information (Traffic info) field.

Finally, the multi-link aggregation operation also needs to support to include a link to an ML-entity, remove a link from an ML-entity, or even directly delete an entire ML-entity. Therefore, in a possible case, an information element may be newly defined in the action frame. The information element carries a sub-action field to specifically indicate an operation to be performed, and carries both the link info field and the ML-entity info field, to indicate a link and an ML-entity corresponding to the operation. In another possible case, the FST action field may directly indicate an operation to be performed.

In this embodiment of this application, in the process in which the two ML devices perform packet-level multi-link aggregation, the two ML devices communicate with each other by using the MAC addresses of their respective SAPs. In this way, the two ML devices can quickly and accurately implement multi-band communication.

The following describes an interface parameter update method provided in an embodiment of this application.

FIG. 13 is a flowchart of an interface parameter update method according to an embodiment of this application. Refer to FIG. 13. The method includes the following step:

Step 1301: An ML device updates, based on a status change of each of a plurality of network interfaces included in the ML device, parameters of enabled network interfaces in the plurality of network interfaces.

It should be noted that the plurality of network interfaces included in the ML device work on different frequency bands, and the plurality of network interfaces share antennas configured in the ML device. For example, the ML device is configured with three antennas, and the ML device includes three network interfaces. When the three network interfaces are all enabled, each network interface may use one antenna, and can receive and send only one stream. When only one network interface is enabled, the network interface may use all the three antennas, and may correspondingly receive and send three streams.

Figure 14:
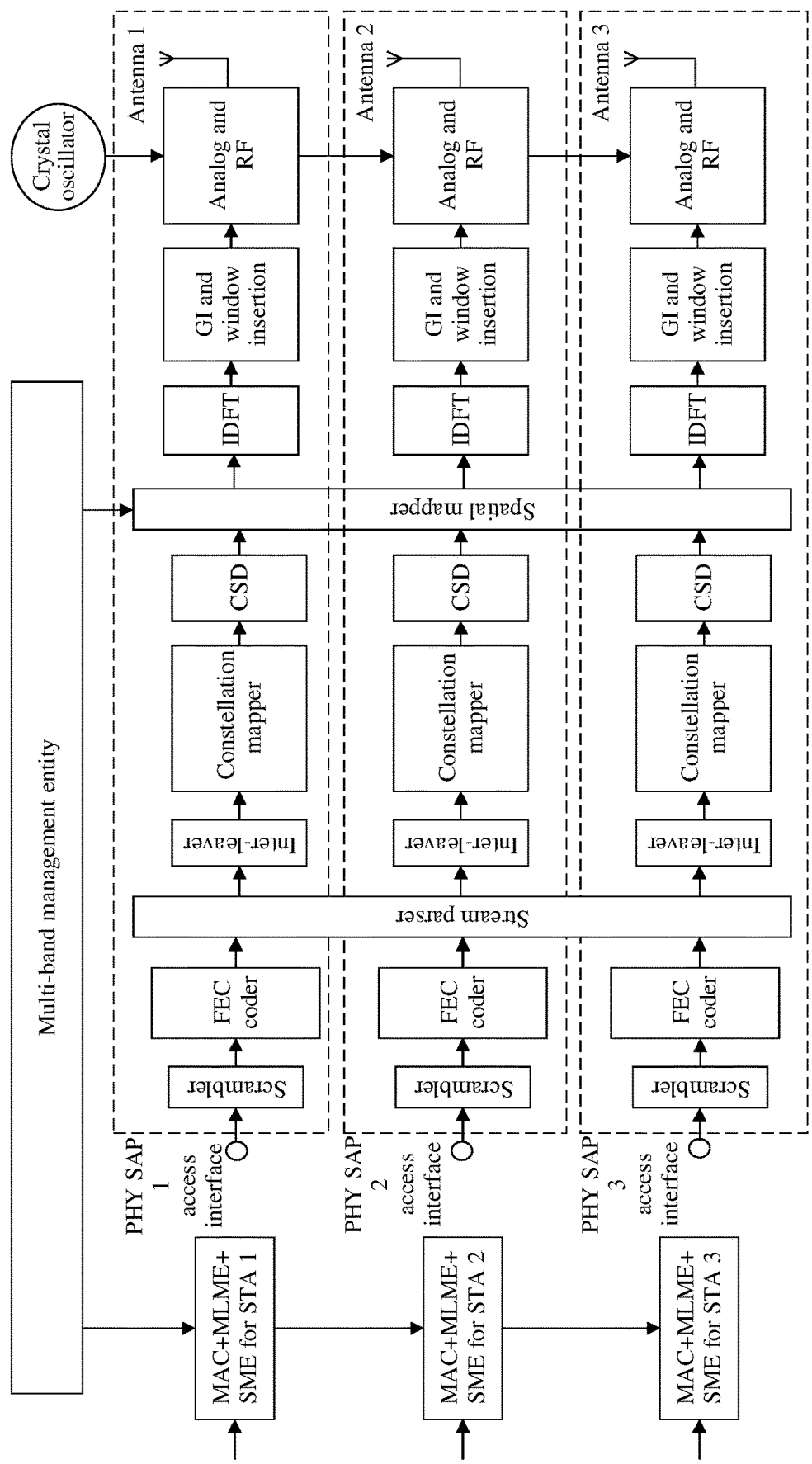
FIG. 14 is a block diagram of an ML device according to an embodiment of this application.

For example, in a possible block diagram of the ML device shown in FIG. 14, the ML device has three independent antennas, corresponding transmit/receive chains, and baseband processing modules. When three network interfaces are enabled, each network interface separately uses one antenna, and each network interface has its own MAC, MAC layer management entity (MLME), station management entity (SME), and one physical layer (PHY) receive/transmit chain (in other words, a maximum of one stream is supported). When only one network interface is enabled, the network interface is configured with only one MAC, MLME, SME, and three PHY receive/transmit chains (in other words, a maximum of three streams are supported). When two network interfaces are enabled, each network interface has its own MAC, MLME, and SME, one of the network interfaces can be configured with one PHY receive/transmit chain (in other words, a maximum of one stream is supported), and the other network interface uses the rest two PHY receive/transmit chains (in other words, a maximum of two streams is supported). One PHY receive/transmit chain may include a scrambler, a forward error correction (FEC) coder, a stream parser, an inter-leaver, a constellation mapper, a cyclic shift diversity (CSD), a spatial mapper, inverse discrete Fourier transform (IDFT), guard interval (GI) and window insertion, analog and radio frequency (radio frequency, RF), and an antenna. In addition, the three PHY receive and transmit chains may share stream parsers and spatial mappers.

In addition, the status change of the network interface means that the network interface changes from an enabled state to a disabled state, or changes from a disabled state to an enabled state. When a state of a network interface changes, the status of sharing, by the plurality of network interfaces, the antennas configured in the ML device changes. In this case, the parameters of the enabled network interfaces in the plurality of network interfaces change. Therefore, the ML device may update the parameters of the enabled network interfaces, to ensure normal use of the enabled network interfaces and normal communication of the ML device.

In addition, the parameters of the network interface include at least one of capability information, an operation parameter, or the like. For example, the parameters of the network interface may include at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, channel bandwidth, or transmit power.

Specifically, an operation of step 1301 may be: After enabling or disabling one of the plurality of network interfaces, the ML device configures parameters of each of all the enabled network interfaces in the plurality of network interfaces, and sends the parameters of all the enabled network interfaces through each of the enabled network interfaces.

It should be noted that after the ML device enables one of the plurality of network interfaces or disables one of the plurality of network interfaces, the enabled network interfaces in the plurality of network interfaces change. In this case, the status of sharing, by the plurality of network interfaces, the antennas configured in the ML device changes. Therefore, the ML device needs to reconfigure the parameters of each of all the enabled network interfaces in the plurality of network interfaces accordingly. In addition, after completing parameter configuration of the network interfaces, the ML device may further send the parameters of all the enabled network interfaces through each of the enabled network interfaces. In this way, another device that establishes a communication connection to any network interface in the ML device may obtain, from information sent by the network interface, the parameters of all the enabled network interfaces in the ML device. Therefore, the another device adjusts a communication policy of the another device in a timely manner based on the parameters of all the enabled network interfaces in the ML device. For example, the another device may establish communication connections to all the enabled network interfaces based on the parameters, or switch from a currently connected network interface to another network interface based on the parameters. This is not limited in this embodiment of this application.

In this embodiment of this application, the ML device includes the plurality of network interfaces, the plurality of network interfaces work on the different frequency bands, and the plurality of network interfaces share the antennas configured in the ML device. The ML device updates, based on the status change of each of the plurality of network interfaces included in the ML device, the parameters of the enabled network interfaces in the plurality of network interfaces. In this way, normal use of the enabled network interfaces and normal communication of the ML device can be ensured.

Figure 15:
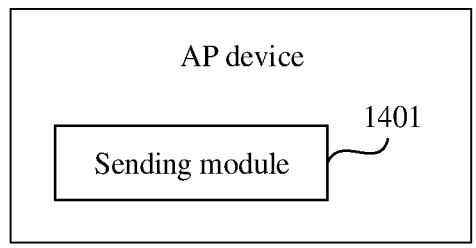
FIG. 15 is a schematic diagram of a structure of an AP device according to an embodiment of this application.

FIG. 15 is a schematic diagram of a structure of an AP device according to an embodiment of this application. Refer to FIG. 15. The AP device includes: a sending module 1401, configured to: in a process in which an AP device authenticates a STA device, send a target packet to the STA device, where the AP device includes a plurality of APs, and the plurality of APs work on different frequency bands. The target packet includes a plurality of multi-band elements, the plurality of multi-band elements one-to-one correspond to the plurality of APs, each of the plurality of multi-band elements includes frequency band information of a corresponding AP, and the plurality of multi-band elements indicate the STA device to perform association and key derivation with the plurality of APs.

Optionally, the target packet is an association response frame generated in an association process, and/or the target packet is a key message generated in a key derivation process.

Optionally, when the target packet is the key message generated in the key derivation process, the target packet further includes a robust security network information element, the robust security network information element includes a request type, and the request type includes a single-link association type and a corresponding key derivation type, or the request type includes a multi-link association type and a corresponding key derivation type.

Optionally, the STA device includes a plurality of STAs, the plurality of STAs work on different frequency bands, the plurality of STAs have different MAC addresses, the plurality of STAs correspond to a first SAP, and the plurality of APs correspond to a second SAP.

An association request frame sent by the STA device to the AP device includes a first information element, where the first information element includes a MAC address of the first SAP, or an address field in a frame header of an association request frame sent by the STA device to the AP device includes a MAC address of the first SAP. The MAC address of the first SAP is used to generate a key in the key derivation process.

An association response frame sent by the AP device to the STA device includes a second information element, where the second information element includes a MAC address of the second SAP, or an address field in a frame header of an association response frame sent by the AP device to the STA device includes a MAC address of the second SAP. The MAC address of the second SAP is used to generate a key in the key derivation process.

Optionally, the first information element may further include indication information indicating an encryption algorithm preferentially used by the STA device, and/or the first information element may further include a MAC address of each of the plurality of STAs.

The second information element further includes indication information indicating an encryption algorithm preferentially used by the AP device, and/or the second information element may further include a MAC address of each of the plurality of APs.

Optionally, an association request frame sent by the STA device to the AP device includes a third information element, the third information element includes multi-AP association indication information, and the multi-AP association indication information is used to request to simultaneously perform association and key derivation with the plurality of APs.

An association response frame sent by the AP device to and the STA device includes a second information element, and the second information element includes a MAC address of a second SAP, or an address field in a frame header of an association response frame sent by the AP device to the STA device includes a MAC address of a second SAP. The MAC address of the second SAP is used to generate a key in the key derivation process.

Optionally, a beacon frame sent by each of the plurality of APs includes an access control policy information element, and the access control policy information element includes at least one of a quantity of the plurality of APs, an access policy of each of the plurality of APs, switching threshold indication information, or STA association restriction.

The switching threshold indication information indicates the STA device to perform AP switching when signal quality decreases to a first threshold, and the STA association restriction indicates a type of a STA that is allowed to be associated with each of the plurality of APs.

Optionally, for any one of the plurality of APs, an access policy of the AP includes at least one of a service policy or timeout information.

The service policy indicates a highest AC or a TID of a data packet that is allowed by the AP to transmit, and the timeout information indicates the STA device to perform AP switching when the STA device does not receive, within a preset duration, a data packet that is of a highest AC or a TID and that is allowed by the AP to transmit.

In this embodiment of this application, the AP device includes the plurality of APs, and the plurality of APs work on the different frequency bands. In the process in which the AP device authenticates the STA device, the AP device may send, to the STA device, the target packet that includes the plurality of multi-band elements, to send, to the STA device, related information about the frequency bands on which the plurality of APs included in the AP device work, and indicate the STA device to perform association and key derivation with the plurality of APs. In this way, the STA device can quickly switch among the plurality of APs.

Figure 16:
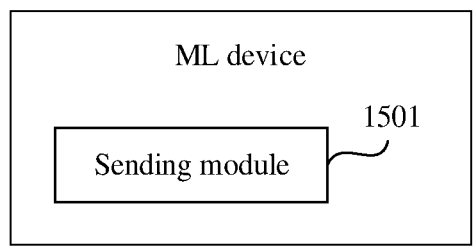
FIG. 16 is a schematic diagram of a structure of a first ML device according to an embodiment of this application.

FIG. 16 is a schematic diagram of a structure of an ML device according to an embodiment of this application. Refer to FIG. 16. The ML device includes: a sending module 1501, configured to: in a process in which the ML device performs FST with the other ML device, send an FST frame to the other ML device, where the FST frame includes a multi-band element.

The multi-band element includes a packet-level MLA supported field, and the packet-level MLA supported field indicates whether packet-level multi-link aggregation is supported.

Optionally, the ML device is a STA device, and the other ML device is an AP device. The multi-band element in the FST frame sent by the STA device to the AP device includes a non-collocated supported field, and the non-collocated supported field indicates whether non-collocated multi-link aggregation is supported.

Optionally, the ML device is the STA device, and the other ML device is the AP device.

The multi-band element in the FST frame sent by the AP device to the STA device includes a multi-band connection capability field, the multi-band connection capability field includes a non-collocated AP indication bit, and the non-collocated AP indication bit indicates whether multi-link aggregation with an AP that belongs to another physical device is supported.

Optionally, the ML device is a STA device, the other ML device is an AP device, and the FST frame sent by the STA device to the AP device includes a mobility domain element.

The mobility domain element includes a non-collocated supported field, and the non-collocated supported field indicates whether non-collocated multi-link aggregation is supported. Alternatively, the mobility domain element includes a non-collocated flow-level MLA supported field and a non-collocated packet-level MLA supported field. The non-collocated flow-level MLA supported field indicates whether non-collocated multi-link aggregation is supported when flow-level multi-link aggregation is performed, and the non-collocated packet-level MLA supported field indicates whether non-collocated multi-link aggregation is supported when packet-level multi-link aggregation is performed.

Optionally, the multi-band element further includes a first flag bit, the first flag bit indicates whether the multi-band element includes a link identity field, and the link identity field indicates a frequency band to which the ML device and the other ML device need to transfer an FST session.

Optionally, the multi-band element further includes a second flag bit, the second flag bit indicates whether the multi-band element includes a multi-band control field, and the multi-band control field includes the packet-level MLA supported field.

In this embodiment of this application, in the process in which the two ML devices perform FST, the ML device sends the FST frame to the other ML device. The FST frame includes the multi-band element, the multi-band element includes the packet-level MLA supported field, and the packet-level MLA supported field indicates whether packet-level multi-link aggregation is supported. In this way, the two ML devices that perform FST may learn whether each other supports packet-level multi-link aggregation, and perform FST based on whether each other supports packet-level multi-link aggregation, so that the two devices complete FST more quickly and accurately.

Figure 17:
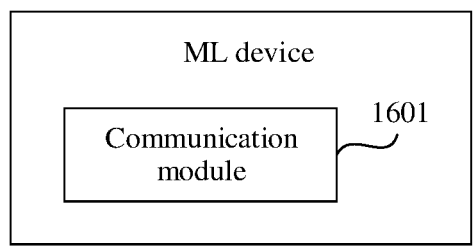
FIG. 17 is a schematic diagram of a structure of a second ML device according to an embodiment of this application.

FIG. 17 is a schematic diagram of a structure of an ML device according to an embodiment of this application. Refer to FIG. 17. The ML device includes: a communication module 1601, configured to: in a process in which the ML device performs packet-level multi-link aggregation with the other ML device, communicate with the other ML device by using a MAC address of an SAP of the ML device, where the SAP of the ML device corresponds to a plurality of network interfaces included in the ML device.

Optionally, in a communication process of the ML device and the other ML device, an address field of a data frame sent by the ML device to the other ML device includes a MAC address of an SAP of the other ML device.

Optionally, in the communication process of the ML device and the other ML device, an address field of a control frame sent by the ML device to the other ML device includes the MAC address of the SAP of the other ML device or a MAC address of one network interface of the other ML device, and an address field of a management frame sent by the ML device to the other ML device includes the MAC address of the SAP of the other ML device or the MAC address of the one network interface of the other ML device; or in the communication process of the ML device and the other ML device, address fields in a control frame and a management frame that are sent by the ML device to the other ML device both include a MAC address of one network interface of the other ML device; or in the communication process of the ML device and the other ML device, an address field of a specified control frame sent by the ML device to the other ML device includes the MAC address of the SAP of the other ML device, and an address field in a management frame sent by the ML device to the other ML device and an address field in a control frame other than the specified control frame both include a MAC address of one network interface of the other ML device.

Optionally, in the communication process of the ML device and the other ML device, a frame header of the control frame sent by the ML device to the other ML device includes an aggregation control field, and the aggregation control field includes a multi-link entity identifier and control information.

Optionally, in the communication process of the ML device and the other ML device, an action frame sent by the ML device to the other ML device includes a category field, and a value of the category field is the same as a value of the category field included in an FST frame.

Optionally, when the action frame is a multi-link aggregation setup request frame or a multi-link aggregation setup response frame, the action frame includes a fourth information element, and the fourth information element indicates multi-link entity information.

Optionally, the fourth information element includes at least one of a collocated field, a multi-link aggregation initiator MAC address field, a multi-link aggregation responder MAC address field, a multi-link entity identifier field, a home link information field, or a component link information list field. The component link information list field indicates information about each component link.

In this embodiment of this application, in the process in which two ML devices perform packet-level multi-link aggregation, the two ML devices communicate with each other by using MAC addresses of their respective SAPs. In this way, the two ML devices can quickly and accurately implement multi-band communication.

Figure 18:
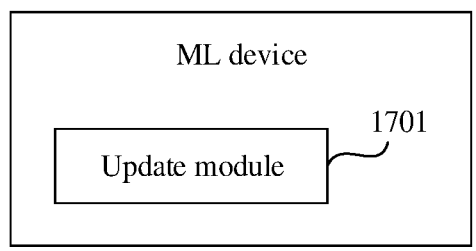
FIG. 18 is a schematic diagram of a structure of a third ML device according to an embodiment of this application.

FIG. 18 is a schematic diagram of a structure of an ML device according to an embodiment of this application. Refer to FIG. 18. The ML device includes: an update module 1701, configured to update, based on a status change of each of a plurality of network interfaces included in the ML device, parameters of enabled network interfaces in the plurality of network interfaces. The parameters include at least one of capability information or an operation parameter, the plurality of network interfaces work on different frequency bands, and the plurality of network interfaces share antennas configured in the ML device.

Optionally, that the update module 1701 updates, based on the status change of each of the plurality of network interfaces included in the ML device, the parameters of the enabled network interfaces in the plurality of network interfaces includes:

After enabling or disabling one of the plurality of network interfaces, the ML device configures parameters of each of all the enabled network interfaces in the plurality of network interfaces, and sends the parameters of all the enabled network interfaces through each of the enabled network interfaces.

Optionally, the parameters include at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, channel bandwidth, or transmit power.

In this embodiment of this application, the ML device includes the plurality of network interfaces, the plurality of network interfaces work on the different frequency bands, and the plurality of network interfaces share the antennas configured in the ML device. The ML device updates, based on the status change of each of the plurality of network interfaces included in the ML device, the parameters of the enabled network interfaces in the plurality of network interfaces. In this way, normal use of the enabled network interfaces and normal communication of the ML device can be ensured.

It should be noted that when the device provided in the foregoing embodiments works, division into the foregoing functional modules is merely used as an example for description. In actual application, the foregoing functions may be allocated to different functional modules for implementation according to a requirement. That is, an internal structure of the device is divided into different functional modules to implement all or some of the functions described above. In addition, the device provided in the foregoing embodiments belongs to a same concept as the method embodiments of this application. For a specific implementation process of the device, refer to the method embodiments. Details are not described herein again.

Figure 19:
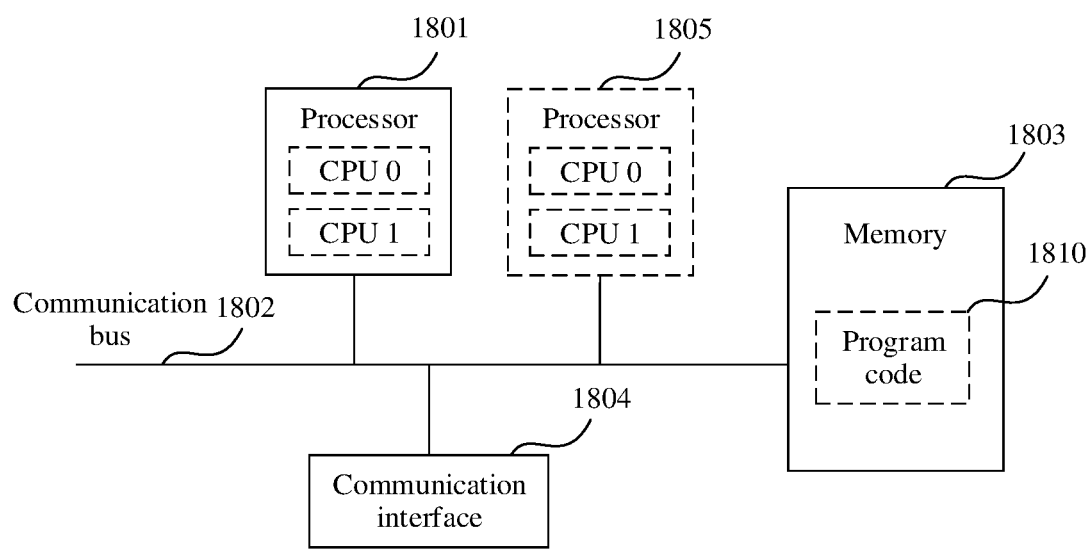
FIG. 19 is a schematic diagram of a structure of a computer device according to an embodiment of this application.

FIG. 19 is a schematic diagram of a structure of a computer device according to an embodiment of this application. The computer device may be the AP device shown in FIG. 15, or the ML device shown in any one of FIG. 16 to FIG. 18. Refer to FIG. 19. The network device includes at least one processor 1801, a communication bus 1802, a memory 1803, and at least one communication interface 1804.

The processor 1801 may be a general-purpose central processing unit (CPU), a microprocessor, or an application-specific integrated circuit (ASIC); or may be one or more integrated circuits configured to control program execution in the solutions of this application.

The communication bus 1802 may include a path for transferring information between the foregoing components.

The memory 1803 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium capable of carrying or storing expected program code in a form of instructions or a data structure and capable of being accessed by a computer. This is not limited thereto. The memory 1803 may exist independently and be connected to the processor 1801 through the communication bus 1802. Alternatively, the memory 1803 may be integrated with the processor 1801.

The communication interface 1804 uses any apparatus such as a transceiver, and is configured to communicate with another device or a communication network, such as an Ethernet, a radio access network (RAN), or a wireless local area network (WLAN).

In a specific implementation, in an embodiment, the processor 1801 may include one or more CPUs, for example, a CPU 0 and a CPU 1 in FIG. 19.

In a specific implementation, in an embodiment, the computer device may include a plurality of processors, such as the processor 1801 and a processor 1805 shown in FIG. 19. Each of the processors may be a single-core processor (single-CPU) or a multi-core processor (multi-CPU). The processor herein may be one or more devices, circuits, and/or processing cores configured to process data (for example, computer program instructions).

The foregoing computer device may be a general-purpose computer device or a dedicated computer device. In a specific implementation, the computer device may be a desktop computer, a portable computer, a network server, a palmtop computer (Personal Digital Assistant, PDA), a mobile phone, a tablet, a wireless terminal device, a communication device, or an embedded device. A type of the computer device is not limited in the embodiments of this application.

The memory 1803 is configured to store program code 1810 for executing the solutions of this application, and the processor 1801 is configured to execute the program code 1810 stored in the memory 1803. The computer device may implement the corresponding method embodiments in this application by using the processor 1801 and the program code 210 in the memory 1803.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method for updating one or more interface parameters, comprising:
    updating, by a multi-link (ML) device based on enabling or disabling of one or more of a plurality of network interfaces comprised in the ML device, parameters of enabled network interfaces in the plurality of network interfaces, wherein the parameters of the enabled network interfaces comprise at least one of capability information or an operation parameter, the plurality of network interfaces work on different frequency bands, and the plurality of network interfaces share antennas configured in the ML device,
    wherein a status of a network interface in the plurality of network interfaces changes from a disabled state to an enabled state when the network interface is being enabled, and a status of a network interface in the plurality of network interfaces changes from an enabled state to a disabled state when the network interface is being disabled.

2. The method according to claim 1, wherein the updating, by a multi-link (ML) device based on enabling or disabling of one or more of a plurality of network interfaces comprised in the ML device, parameters of enabled network interfaces in the plurality of network interfaces comprises:
    after enabling or disabling one of the plurality of network interfaces, configuring, by the ML device, parameters of each of the enabled network interfaces in the plurality of network interfaces, and sending the parameters of the enabled network interfaces through each of the enabled network interfaces.

3. The method according to claim 1, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

4. The method according to claim 2, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

5. The method according to claim 1, wherein the updating of parameters of the enabled network interfaces in the plurality of network interfaces comprises configuring each of the enabled network interfaces so that the antennas configured in the ML device are shared among the enabled network interfaces in the plurality of network interfaces, but not shared by any disabled network interface in the plurality of network interfaces.

6. The method according to claim 1, wherein the updating of parameters of the enabled network interfaces in the plurality of network interfaces comprises configuring each of the enabled network interfaces with Media Access Control (MAC), MAC layer management entity (MLME), station management entity (SME), and one or more physical layer (PHY) receive/transmit chains.

7. The method according to claim 6, wherein each of the one or more PHY receive/transmit chains includes analog and radio frequency (RF) and an antenna.

8. The method according to claim 7, wherein each of the one or more PHY receive/transmit chains further includes a scrambler, a forward error correction (FEC) coder, a stream parser, an inter-leaver, a constellation mapper, a cyclic shift diversity (CSD), a spatial mapper, inverse discrete Fourier transform (IDFT), and guard interval (GI) and window insertion.

9. An apparatus, applied for a multi-link (ML) device, comprising:
    at least one processor; and a non-transitory computer-readable storage medium coupled to the at least one processor and storing programming instructions that, when executed by the at least one processor, instruct the at least one processor to perform operations comprising:

updating, based on enabling or disabling of one or more of a plurality of network interfaces comprised in the apparatus, parameters of enabled network interfaces in the plurality of network interfaces, wherein the parameters comprise at least one of capability information or an operation parameter, the plurality of network interfaces work on different frequency bands, and the plurality of network interfaces share antennas configured in the apparatus, wherein a status of a network interface in the plurality of network interfaces changes from a disabled state to an enabled state when the network interface is being enabled, and a status of a network interface in the plurality of network interfaces changes from an enabled state to a disabled state when the network interface is being disabled.

10. The apparatus according to claim 9, wherein the updating, based on enabling or disabling of one or more of a plurality of network interfaces comprised in the apparatus, parameters of enabled network interfaces in the plurality of network interfaces comprises:

after enabling or disabling one of the plurality of network interfaces, configuring, parameters of each of the enabled network interfaces in the plurality of network interfaces, and sending the parameters of the enabled network interfaces through each of the enabled network interfaces.

11. The apparatus according to claim 9, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

12. The apparatus according to claim 10, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

13. A non-transitory computer-readable storage medium, storing instructions that, when executed by at least one processor, cause an apparatus applied for a multi-link (ML) device to perform operations comprising:

updating, based on enabling or disabling of one or more of a plurality of network interfaces comprised in the apparatus, parameters of enabled network interfaces in the plurality of network interfaces, wherein the parameters comprise at least one of capability information or an operation parameter, the plurality of network interfaces work on different frequency bands, and the plurality of network interfaces share antennas configured in the apparatus, wherein a status of a network interface in the plurality of network interfaces changes from a disabled state to an enabled state when the network interface is being enabled, and a status of a network interface in the plurality of network interfaces changes from an enabled state to a disabled state when the network interface is being disabled.

14. The non-transitory computer-readable storage medium according to claim 13, wherein the updating, based on enabling or disabling of one or more of a plurality of network interfaces comprised in the apparatus, parameters of enabled network interfaces in the plurality of network interfaces comprises:

after enabling or disabling one of the plurality of network interfaces, configuring, parameters of each of the enabled network interfaces in the plurality of network interfaces, and sending the parameters of the enabled network interfaces through each of the enabled network interfaces.

15. The non-transitory computer-readable storage medium according to claim 13, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

16. The non-transitory computer-readable storage medium according to claim 14, wherein the parameters comprise at least one of a configured quantity of transmit and receive antennas, a maximum supported quantity of to-be-sent or to-be-received streams, a parameter that indicates whether simultaneous sending and receiving with another network interface is supported, a highest modulation and coding scheme that is allowed to be used by devices at two ends of a link when adjacent channel interference exists on the link, a security margin that needs to be reserved at a transmit end of the link, a channel bandwidth, or transmit power.

* * * * *